(12) United States Patent
Yontz et al.

(10) Patent No.: US 8,728,625 B2
(45) Date of Patent: May 20, 2014

(54) WATER REDUCIBLE COATING COMPOSITIONS INCLUDING CARBOXY ESTER KETALS, METHODS OF MANUFACTURE, AND USES THEREOF

(75) Inventors: Dorie J. Yontz, Bloomington, MN (US); Daniel Warren Gilbert, Richfield, MN (US); Lee R. Rieth, Plymouth, MN (US); Cora M. Leibig, Maple Grove, MN (US); Mike Jackson, Louisville, KY (US)

(73) Assignee: Segetis, Inc., Golden Valley, MN (US)

( * ) Notice: Subject to any disclaimer, the term of this patent is extended or adjusted under 35 U.S.C. 154(b) by 170 days.

(21) Appl. No.: 13/276,091

(22) Filed: Oct. 18, 2011

(65) Prior Publication Data

US 2012/0094135 A1    Apr. 19, 2012

Related U.S. Application Data

(60) Provisional application No. 61/394,099, filed on Oct. 18, 2010.

(51) Int. Cl.
 B32B 27/00    (2006.01)
 B05D 3/02    (2006.01)
 C08L 63/00    (2006.01)
 C08K 5/00    (2006.01)

(52) U.S. Cl.
 USPC ......... 428/500; 427/385.5; 523/426; 524/108

(58) Field of Classification Search
 None
 See application file for complete search history.

(56) References Cited

U.S. PATENT DOCUMENTS

| | | |
|---|---|---|
| 1,934,309 A | 11/1933 | Hoover |
| 2,008,720 A | 7/1935 | Lawson |
| 2,260,261 A | 10/1941 | Morey et al. |
| 2,556,135 A | 6/1951 | Croxall et al. |
| 2,654,723 A | 10/1953 | Greene |
| 2,985,536 A | 5/1961 | Stein et al. |
| 3,201,420 A | 8/1965 | Fuzesi et al. |
| 3,658,789 A | 4/1972 | Fried |
| 3,855,248 A | 12/1974 | Lannert et al. |
| 4,460,767 A | 7/1984 | Matsumura et al. |
| 4,737,426 A | 4/1988 | Roth |
| 4,792,411 A | 12/1988 | Walsh |
| 4,806,448 A | 2/1989 | Roth |
| 5,013,543 A | 5/1991 | Mercado et al. |
| 5,093,111 A | 3/1992 | Baker et al. |
| 5,419,848 A | 5/1995 | Van Eenam |
| 5,489,448 A | 2/1996 | Jackson et al. |
| 5,516,459 A | 5/1996 | Van Eenam |
| 5,700,522 A | 12/1997 | Nonweiler et al. |
| 6,010,995 A | 1/2000 | Van Eenam |
| 6,306,249 B1 | 10/2001 | Galante et al. |
| 6,423,480 B2 | 7/2002 | Ichiki |
| 6,423,677 B1 | 7/2002 | Van Eenam |
| 6,451,223 B1 | 9/2002 | Jeon |
| 6,627,181 B1 | 9/2003 | Busch, Jr. et al. |
| 6,749,998 B2 | 6/2004 | Schwartzkopf et al. |
| 6,806,392 B2 | 10/2004 | Boesch et al. |
| 7,094,395 B1 | 8/2006 | Qu et al. |
| 7,179,775 B2 | 2/2007 | Foster |
| 7,705,081 B2 | 4/2010 | Porzio et al. |
| 8,053,468 B2 * | 11/2011 | Selifonov ................... 514/467 |
| 2003/0036489 A1 | 2/2003 | Liu et al. |
| 2003/0167681 A1 | 9/2003 | Delgado Puche |
| 2004/0024260 A1 | 2/2004 | Winkler et al. |
| 2004/0157759 A1 | 8/2004 | Scherubel |
| 2004/0167245 A1 | 8/2004 | Chappelow et al. |
| 2005/0233927 A1 | 10/2005 | Scherubel |
| 2006/0069230 A1 | 3/2006 | Papisov |
| 2006/0207037 A1 | 9/2006 | Fadel et al. |
| 2006/0208226 A1 | 9/2006 | Maze et al. |
| 2006/0211855 A1 | 9/2006 | Doring et al. |
| 2007/0079722 A1 | 4/2007 | Parish |
| 2007/0111917 A1 | 5/2007 | Lang et al. |
| 2007/0161530 A1 | 7/2007 | Kaneda et al. |
| 2008/0081779 A1 | 4/2008 | Holscher |
| 2008/0124426 A1 | 5/2008 | Kobler et al. |
| 2008/0188603 A1 | 8/2008 | Porzio et al. |

(Continued)

FOREIGN PATENT DOCUMENTS

| | | |
|---|---|---|
| CA | 1000285 | 11/1976 |
| CA | 2347255 A1 | 2/2004 |

(Continued)

OTHER PUBLICATIONS

Boehm, R., "Knowledge on cyclic ketals. Part 11: Synthesis of some new derivatives and separation of their isomers," Pharmazie 36(5): 329-330 (1981).

Brigl, et al., "The Reaction of the Pyruvic Acid with Glycerin," Annalen der Chemie 476: 215-232 (Received Oct. 7, 1929)(in German Only).

Briol, et al., "Reaction of pyroracemic acid with glycerol," Ann. 476: 215-232 (1929).

Calinaud, et al., "Cyclic acetal series. XIII. Opening of 4-oxo and 4-hydroxy-3,6,8-trioxabicyclo[3.2.1]octane and 3-pxp-2,5,7-trioxabicyclo[2.2.2]octane rings by lithium aluminum hydride and methylmagnesium iodide," Carbohydrate Research 30(1) 35-43 (1973).

Carey, et al., "Advanced Organic Chemistry, Second Edition, Part B: Reactions and Synthesis," Plenum Press 539-552 (1983).

(Continued)

*Primary Examiner* — Sheeba Ahmed
(74) *Attorney, Agent, or Firm* — Cantor Colburn LLP

(57) ABSTRACT

A water-reducible coating composition includes a water-reducible polymer binder; water; and a ketal adduct of formula (1)

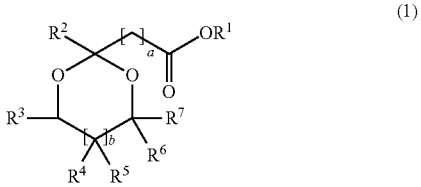

as well as coated substrates and films formed from the compositions. The films are useful as paints, stains, and clearcoats.

44 Claims, 4 Drawing Sheets

(56) References Cited

U.S. PATENT DOCUMENTS

| | | | |
|---|---|---|---|
| 2008/0242721 A1* | 10/2008 | Selifonov | 514/467 |
| 2008/0305978 A1 | 12/2008 | Wietfeldt et al. | |
| 2011/0196081 A1 | 8/2011 | Kwon et al. | |
| 2011/0274634 A1 | 11/2011 | Rieth | |
| 2011/0300083 A1 | 12/2011 | Yontz et al. | |

FOREIGN PATENT DOCUMENTS

| | | | |
|---|---|---|---|
| DE | 3220035 A1 | 1/1983 | |
| DE | 10036423 A1 | 3/2001 | |
| EP | 012543 A1 | 6/1980 | |
| EP | 0308956 A2 | 3/1989 | |
| EP | 0507190 A1 | 10/1992 | |
| EP | 0913463 A1 | 5/1999 | |
| FR | 1445013 | 7/1966 | |
| JP | 284327 | 9/1953 | |
| JP | 2800437 A | 9/1953 | |
| JP | 4217972 | 8/1992 | |
| JP | 2006143702 A | 6/2006 | |
| SU | 722912 | 3/1980 | |
| WO | 9412489 A1 | 6/1994 | |
| WO | 2004099173 A1 | 11/2004 | |
| WO | 2005095378 A2 | 10/2005 | |
| WO | 2005097723 A2 | 10/2005 | |
| WO | 2005097724 A1 | 10/2005 | |
| WO | WO2007062158 A2 | 5/2007 | |
| WO | 2007094922 A2 | 8/2007 | |
| WO | 2008089463 A2 | 7/2008 | |
| WO | 2008098375 A1 | 8/2008 | |
| WO | 2010/075330 | 7/2010 | |
| WO | WO2010/075330 | 7/2010 | |

OTHER PUBLICATIONS

Cuiling, et al., "Synthesis of Levulinic Ketals with Furfuryl Alcohol as Raw Material," Journal of Huagiao University (Nature Science) 23(3): 257-259 (2002) (English Translation).

Eastman Chemical Company. (May 2006). Selecting Coupling Agents for Multi-phase Models. Retrieved Aug. 13, 2009, from http://www.eastman.com/Literature Center/M/M207.pdf.

Gelas, et al., "Synthese du 4-oxo et de 4-hydroxy-3,6,8-trioxabicyclo[3.2.1]octanes," Carbohydrate Research 30(1): 21-34 (1973) (with English abstract).

Grosu, et al., "Stereochemistry and NMR Spectra of Some New Unsymmetrical Substituted 2,2-Dialkyl-1,3-Dioxanes," Revue Roumaine de Chimie 41(3-4): 259-263 (1996).

Gutsche, et al., "Reactions of Ethyl Diazoacetate with Aromatic Compounds Containing Hetero Atoms Attached to the Benzyl Carbon," J. Am. Chem. Soc. 76: 2236-2240 (1954).

Haskelbhrg, L., "The preparation of glycerol esters of amino acids," Compt. rend. 190270-190272 (1930).

Hegde, et al., "The Kinetics and Thermodynamics of Bicyclic Ketal Formation: An Application to the Synthesis of the Zaragozic Acids," Tetrahedron 53(32): 11179-11190 (1997).

Horsfall, et al., "Fungitoxicity of Dioxanes, Dioxolanes, and Methylenedioxybenzenes," The Connecticut Agricultrual Experiment Station New Haven, Bulletin 673: 1-44, Jun. 1965.

Lukes, Robert M., Preparation of Methyl Esters Containing the 1,3-Dioxane or 2,4,8,10-Tetroxaspiro[5.5]undecane Structure by Ketal Exchange, 26: 2515-2518 (1961).

Meltzer, et al., "2,2-Disubstituted 1,3-Dioxolanes and 2,2-Disubstituted 1,3-Dioxanes," JOC 25: 712-715 (1960).

Meskens, Frans A.J., "Methods for the Preparation of Acetals from Alcohols or Oxiranes and Carbonyl Compounds," Synthesis 501-522 (1981).

Nakamura, et al., "Study on Ketalization Reaction of Poly (vinyl alcohol) by Ketones. IX. Kinetic Study on Acetalization and Ketalization Reaction of 1,3-Butanediol as a Model Compound for Poly (vinyl alcohol)," Polymer Science Part B: Polymer Physics 35(9): 1719-1731 (2000).

Newman, et al.,"Kinetic and Equilibrium Studies of Cyclic Ketal Formation and Hydrolysis," The Journal of the American Oil Chemist's Society 80: 6350-6355 (1958).

Olson, Edwin S., "Subtask 4.1—Conversion of Lignocellulosic Material to Chemicals and Fuels," Final Report for U.S. Dept. of Energy, National Energy Technology Laboratory, Cooperative Agreement No. DE-FC26-98FT40320 (Jun. 2001).

Ono, et al., "Synthesis and Properties of Soap Types of Cleavable Surfactants Bearing a 1,3-Dioxolane Ring Derived from Long-chain Epoxides and Ethyl Levulinate," J. Jpn. Oil Chem. Soc. 42(12): 965-971 (1993).

Wedmid, et al., "Long-Chain Stereomeric 2-Alkyl-4-methoxycarbonyl-1,3-dioxolanes in Glycerol Acetal Synthesis," J. Org. Chem. 42(22): 3624-3626 (1977).

Yamaguchi, Masahiko, "Synthesis of Polycyclic Aromatic Compounds via Polyketides," Yuki Gosei Kagaku Kyokaishi 45(10) 969-982 (1987) (Chinese—Translation of Abstract Only).

Yang, et al., "Investigation of homopolymerization rate of perfluoro-4,5-substituted-2-methylene-1,3-dioxolane derivatives and properties of the polymers," Journal of Flourine Science 127: 277-281 (2006).

Zhang, et al., "Synthesis of Ketals of 4-Oxopentanoates," Lanzhou Daxue Xuebao, Ziran Kexueban 30(2): 66-70 (1994).

Brigl, Percy, et al., "The Reaction of the Pyruvic Acid with Glycerin," Annalen der Chemie 476: p. 215-232, Received Oct. 7, 1929, (with English translation).

Holmberg, Krister, "Surfactants with controlled half-lives", Current Opinion in Colloid & Interface Science, vol. 1, Issue 5, p. 572-579, Oct. 1996.

International Preliminary Report on Patentability for PCT/US2011/056741 (SGT0037PCT), mailed May 2-13, 2002, 7 pages.

Transmittal of International Preliminary Report on Patentability for PCT/US2011/056741 (SGT0037PCT), mailed May 2, 2013, 1 page.

Transmittal and International Search Report for PCT/US2011/056741 (SGT0037PCT), mailed May 30, 2012, 7 pages.

Written Opinion of the International Searching Authority, mailed May 30, 2012, for PCT/US2011/056741 (SGT0037PCT), 6 pages.

Doolittle, Arthur K., "Application of a Mechanistic Theory of Solvent Action to Plasticizers and Platicization", Journal of Polymer Science, vol. 2, No. 2 (1947) 121-141.

* cited by examiner

WATER REDUCIBLE COATING COMPOSITIONS INCLUDING CARBOXY ESTER KETALS, METHODS OF MANUFACTURE, AND USES THEREOF

CROSS-REFERENCE TO RELATED APPLICATIONS

This application claims the benefit of U.S. Provisional Application No. 61/394,099, filed on Oct. 18, 2010, the entire contents of which are hereby incorporated by reference.

BACKGROUND

This disclosure relates to water reducible coating compositions, in particular water reducible paint compositions comprising a carboxy ester ketal, methods for the manufacture of the compositions, and uses of the compositions.

A variety of water-borne compositions for the formation of coatings are known, for example latexes, emulsions, and water-reducible compositions. "Latexes" refers to compositions containing a latex polymer binder in water. As is known in the art, a latex is a dispersion of sub-micrometer polymer particles formed by emulsion polymerization. The polymer backbone is formed from monomers capable of free-radical polymerization, such as (meth)acrylate monomers, optionally together with various ethylenically unsaturated co-monomers. Because the polymerization process for latexes utilizes emulsion polymerization technology, latexes are sometimes referred to as "emulsions" in the art. However, here, a latex is distinct from an "emulsion coating composition," which refers to waterborne systems in which liquid binders are dispersed in an aqueous continuous phase. Emulsion coating compositions are less common than latex systems, but are utilized in some epoxy-amine, alkyd, and polyurethane products. The binders can include hydrophilic co-monomers to aid in dispersing the resin in the aqueous phase. Surfactants can also be used, alone or in addition to a co-monomer.

"Water-reducible coating compositions" are produced using traditional polymerization techniques rather than emulsion polymerization and often contain a water-miscible organic solvent. The polymer binder is usually modified to make it compatible with the water/organic solvent system. The modification can involve a hydrophilic co-monomer, such as an organic acid, that can impart water reducibility to the oligomeric or polymeric binders. Another modification is to disperse the binder in an aqueous phase with the use of a surfactant, which in some cases can be chemically incorporated into the polymer binder during synthesis of the binder. In each case, the resulting polymers are subsequently mechanically dispersed into the aqueous phase. When polymer particles (either liquid or solid) are formed in water, the water-reducible coating composition is an emulsion (for liquid polymers) or a dispersion (for solid polymers). Another version of a water-reducible coating composition is based on the polymer binder being soluble in the organic solvent/water mixture or partially soluble in the organic solvent/water mixture because the polymer chains form aggregates that are dispersed in the liquid aqueous phase. The solvent partitions between the polymer aggregates and the water. Thermosetting acrylics, epoxies, polyesters, epoxy-esters, and alkyds are examples of binders used in water-reducible coating compositions.

Polyurethane dispersions (PUDs) are examples of water-reducible coating compositions that are aqueous polymer dispersions. The most common method of preparing a PUD is to disperse a prepolymer in water and then build molecular weight by chain extension. The prepolymer can be formed from the reaction of a polyol, an ionizable co-monomer such as 2,2-dimethylolpropionic acid (DMPA), and excess diisocyanate to yield an isocyanate-terminated prepolymer. The DMPA units are converted to their ionic form (by neutralizing with a tertiary amine, for instance) and the prepolymer is diluted with water. The ionizable co-monomer improves the dispersibility of the polymer and helps to stabilize the polymer particle in water. An amine is added to chain extend the prepolymer, producing a high molecular weight polymer in water. Branching and crosslinking may be possible, depending on the choice of comonomers and chain extenders. N-methylpyrrolidone (NMP) is often used during PUD synthesis to dissolve DMPA and to reduce the viscosity in order to make dispersion easier. Another special case of water-reducible coating compositions include those based on alkyd polymer binders, which can have acid groups that are neutralized to allow dispersion in a water-reducible system.

While all water-borne coating compositions contain a polymer binder and water, the different properties of the binders result in different formulation requirements. As mentioned above, water-reducible compositions are often initially dissolved in a nonaqueous solvent to reduce viscosity and aid the dispersion in water. The compositions can further be formulated with a variety of additives, among them a coalescing solvent to promote film formation. The coalescing solvent softens the polymer binder particles by reducing the glass transition temperature (Tg) of the particles, and enabling them to fuse into a continuous film. Thus, when a water-reducible coating composition containing a coalescing solvent is coated onto a substrate, the coating cures by coalescence, where the water and the coalescing solvent evaporate sequentially or simultaneously. During evaporation, the coalescing solvent draws together and softens the polymer binder particles, fusing them together into an entangled polymer film. In some cases, the coalescent does not evaporate and can serve as a plasticizer for the final film. Chemical curing, through a crosslinking agent or an oxidative process, can occur after the film is substantially cured through the solvent evaporation mechanism.

Solvent selection for water-reducible coatings is guided by considerations such as solubility, reactivity, volatility, toxicity, environmental profile, and cost. While a number of solvents are available and in commercial use, there remains a need in the art for new solvents that offer a favorable combination of these characteristics. Further, there is an increasing desire for "bio-sourced" solvents that can be used as replacements for petroleum-sourced solvents. Few bio-source solvents are available that can meet the increasingly demanding technical requirements for water-reducible coating compositions and their resultant coatings, including paints. Even where such solvents are available, the solvents can have various drawbacks. For example, ethanol is a versatile solvent that is readily available from bio-based sources, but its high flammability limits its use in many applications. A further drawback of many bio-sourced solvents is that their chemical and physical properties can only be adjusted to a limited extent.

SUMMARY

There accordingly remains a need in the art for solvents for water-reducible coating compositions, in particular bio-sourced solvents that offer an advantageous combination of one or more attributes such as solubility with one or more components, reactivity, volatility, toxicity, environmental profile, and cost. It would be further advantageous if such solvents could be readily modified to adjust the chemical and physical properties of the solvent to meet the particular needs of a specific application. It would also be advantageous if the bio-sourced solvents provided water-reducible paint compositions that meet one or more customer needs such as good viscosity, balanced dry times, good flow and leveling in the water-reducible coating composition; good adhesion of the dry film, good scrub resistance, durability, impact flexibility, water resistance, chemical resistance, stain resistance, gloss, or hardness in the resultant coating.

In one aspect, the present invention is directed to a water-reducible coating composition comprising a water-reducible polymer binder; water; and a ketal adduct of formula (1)

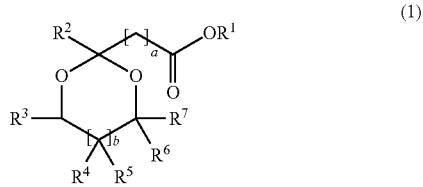

(1)

wherein $R^1$ is C1-6 alkyl, C2-6 alkenyl, C3-6 cycloalkyl, C5-6 cycloalkenyl, C6-12 aryl, C7-C13 arylalkylene, or —$(CH_2)_s$ $OR^8$ wherein s is 1-3 and $R^8$ is C1-6 alkyl or $(OCH_2CH_2)_t$ $OCH_2CH_3$ wherein t is 1-10, $R^2$ is hydrogen or C1-14 alkyl, $R^3$ is hydrogen or C1-6 alkyl, $R^4$ and $R^5$ are each independently hydrogen, C1-6 alkyl, C1-6 alkyl substituted with up to four $OR^9$ groups wherein $R^9$ is hydrogen, C1-6 alkyl, or $C(O)R^{10}$ wherein $R^{10}$ is C1-6 alkyl, or $R^4$ and $R^5$ taken together are a double-bonded oxygen, or when b is 1, $R^3$ and $R^4$ together with their directly attached carbons form a fused cycloaliphatic ring having a total of 5-6 carbon atoms or 4-5 carbon atoms and 1-2 oxygen atoms, $R^6$ is hydrogen, C1-6 alkyl, or hydroxymethylene, or when b is 0, $R^3$ and $R^6$ together with their directly attached carbons form a fused cycloaliphatic or aromatic ring having a total of 5-6 carbon atoms or 4-5 carbon atoms and 1-2 oxygen atoms, $R^7$ is hydrogen, C1-6 alkyl, C1-6 alkyl substituted with up to four $OR^8$ groups wherein $R^8$ is hydrogen, C1-6 alkyl, or $C(O)R^{10}$ wherein $R^{10}$ is C1-6 alkyl, or $R^7$ is C5-6 cylcoalkyl that is optionally substituted with an oxygen in the ring and further optionally substituted with 1-2 hydroxyl or $OR^{11}$ wherein $R^{11}$ is C1-3 alkyl, a is 0-6, and b is 0-1.

In another aspect, the present invention is directed to a method of preparing the water-reducible coating composition, the method comprising combining a water-reducible polymer binder, an aqueous phase, and the ketal adduct of formula (1). In an embodiment, the ketal adduct is present during synthesis of the water-reducible polymer binder. In an embodiment, the ketal adduct is added to the water-reducible polymer binder prior to the binder being combined with the aqueous phase. In another embodiment, the ketal adduct is added after the water-reducible polymer binder is combined with the aqueous phase.

In another aspect, the present invention is directed to a method of coating a substrate comprising contacting the above-described water-reducible coating composition with a surface of the substrate to form a coating; and drying the coating.

In another aspect, the present invention is directed to a coated substrate comprising a substrate having a surface; and a dried coating disposed on the surface of the substrate. In an embodiment, the dried coating comprises a water-reducible polymer binder and a ketal adduct of formula (1).

The above described and other embodiments are further described in the drawings and detailed description that follow.

BRIEF DESCRIPTION OF THE DRAWINGS

The following figures are representative embodiments, wherein the like elements are numbered alike.

DETAILED DESCRIPTION

Figure 1A:
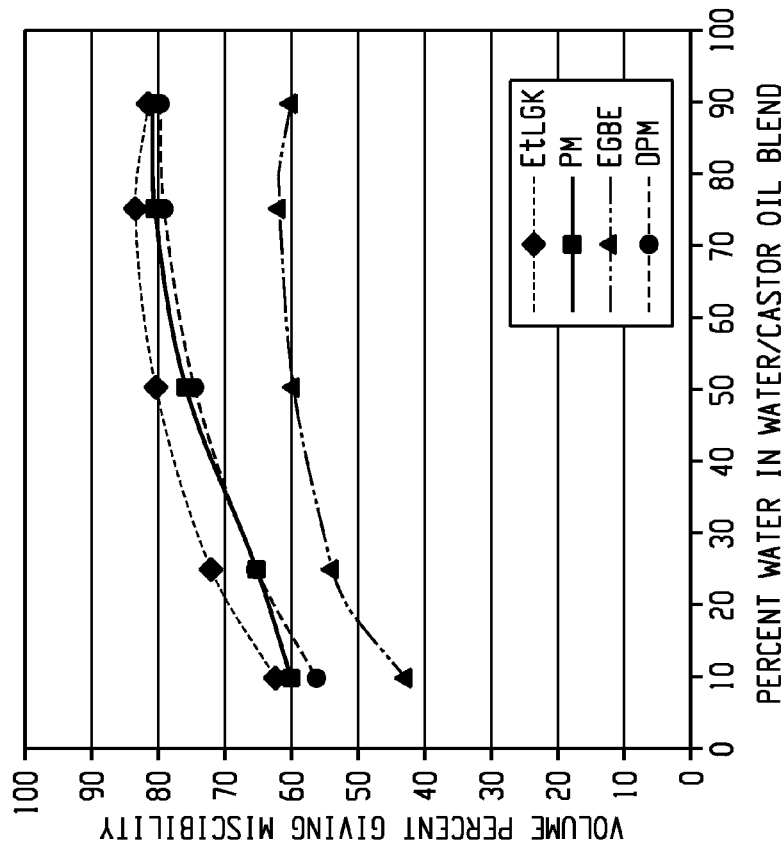
FIG. 1 are graphs showing the coupling ability of four solvents, ethyl levulinate glycerol ketal (EtLGK), propylene glycol methyl ether (PM), ethylene glycol butyl ether (EGBE), and dipropylene glycol methyl ether (DPM) for aqueous mixtures of four water-immiscible liquids: (a) isobutyl isobutyrate (IBIB), (b) castor oil, (c) soy oil methyl esters, and (d) 2,2,4-trimethyl-1,3-pentanediolmono(2-methylpropanoate) (TMP).
Figure 1A:
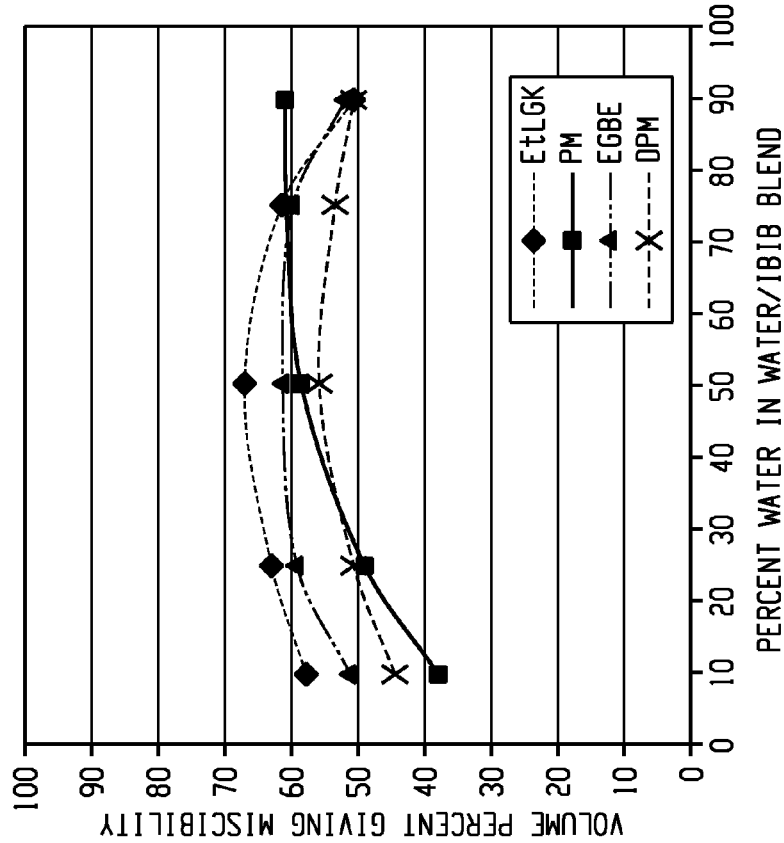
Figure 1B:
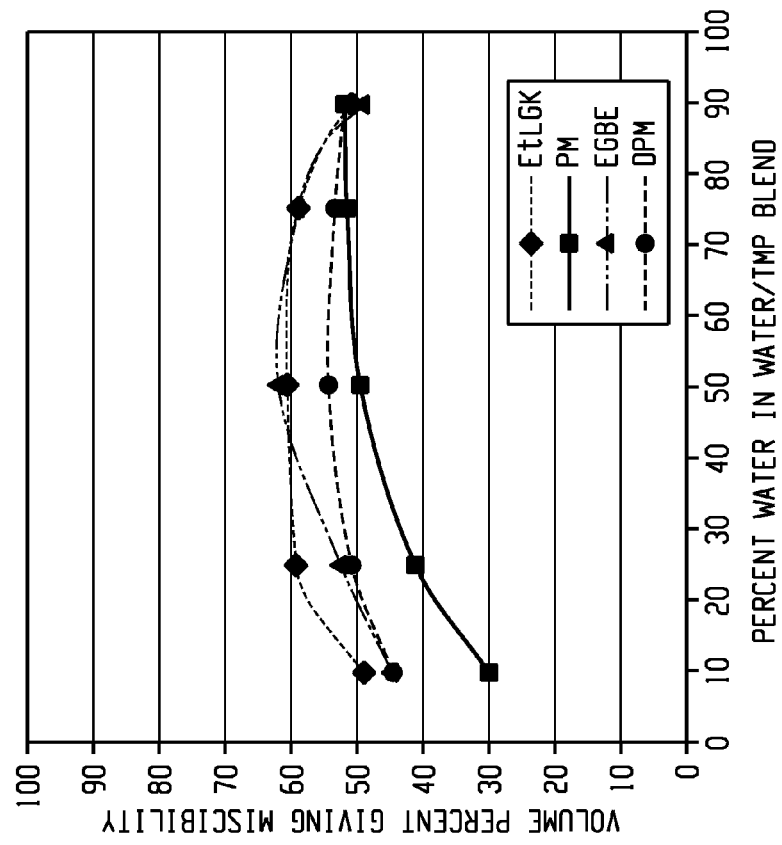
Figure 1B:
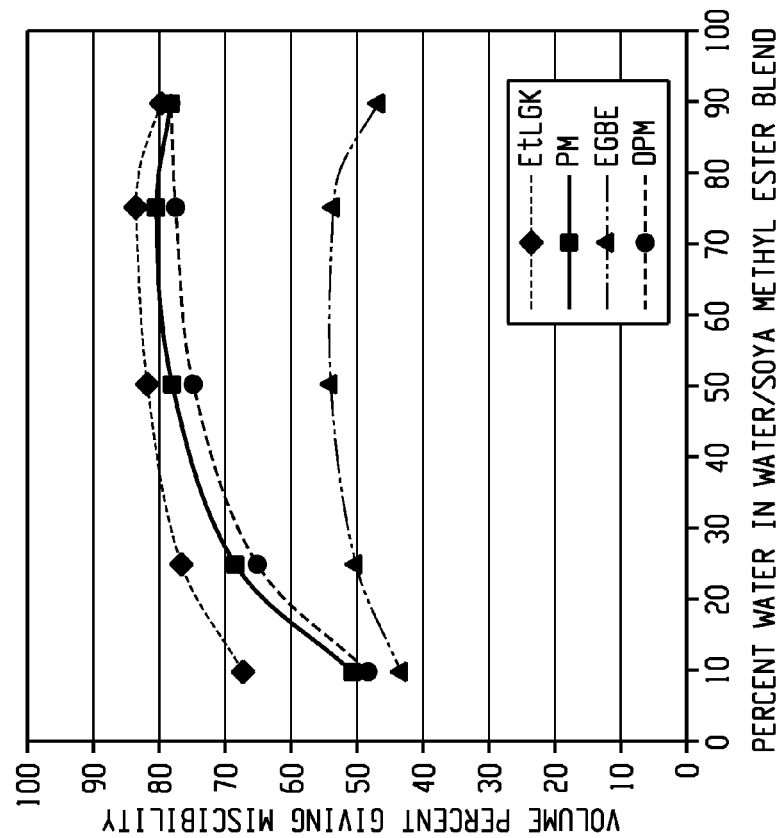

The inventors hereof have discovered that the ketal adducts of ketocarboxy esters, in particular levulinate esters, offer a combination of properties that are useful for water-reducible coating compositions, in particular water-reducible paint compositions. The broad solubilities of the ketal adducts render them useful in a broad variety of polymer types. A further advantage is that certain of the ketal adducts, such as the levulinate ester ketals, can be derived from biological feedstocks. The ketal adducts can therefore be utilized to reduce or replace petroleum-sourced compounds in water-reducible coating compositions. In an embodiment, the ketal adducts also function as a plasticizer in the dried coatings, increasing the flexibility of the coatings, adhesion to the substrate, corrosion resistance, impact resistance, and/or abrasion resistance. In some embodiments, the ketal adduct that remains in the film can be chemically bonded to the polymer binder.

The ketocarboxy ester ketals, sometimes referred to herein as "ketal adducts," have the general formula (1):

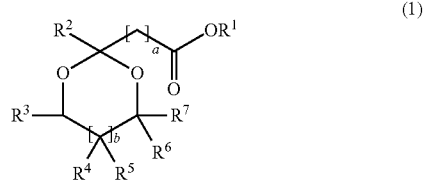

(1)

wherein
R$^1$ is C1-6 alkyl, C2-6 alkenyl, C3-6 cycloalkyl, C5-6 cycloalkenyl, C6-12 aryl, C7-C13 arylalkylene, or —(CH$_2$)$_s$ OR$^8$ wherein s is 1-3 and R$^8$ is C1-6 alkyl or (OCH$_2$CH$_2$)$_t$ OCH$_2$CH$_3$ wherein t is 1-10,
R$^2$ is hydrogen or C1-14 alkyl,
R$^3$ is hydrogen or C1-6 alkyl,
R$^4$ and R$^5$ are each independently
hydrogen, C1-6 alkyl, C1-6 alkyl substituted with up to four OR$^9$ groups wherein R$^9$ is hydrogen, C1-6 alkyl, or —C(O)R$^{10}$ wherein R$^{10}$ is C1-6 alkyl, or
R$^4$ and R$^5$ taken together are a double-bonded oxygen, or
when b is 1, R$^3$ and R$^4$ together with their directly attached carbons form a fused cycloaliphatic ring having a total of 5-6 carbon atoms or 4-5 carbon atoms and 1-2 oxygen atoms,
R$^6$ is
hydrogen, C1-6 alkyl, or hydroxymethylene, or
when b is 0, R$^3$ and R$^6$ together with their directly attached carbons form a fused cycloaliphatic or aromatic ring having a total of 5-6 carbon atoms or 4-5 carbon atoms and 1-2 oxygen atoms,
R$^7$ is
hydrogen, C1-6 alkyl, C1-6 alkyl substituted with up to four OR$^8$ groups wherein R$^8$ is hydrogen, C1-6 alkyl, or —C(O)R$^{10}$ wherein R$^{10}$ is C1-6 alkyl, or
R$^7$ is C5-6 cylcoalkyl that is optionally substituted with an oxygen in the ring and further optionally substituted with 1-2 hydroxyl or OR$^{11}$ wherein R$^{11}$ is C1-3 alkyl,
a is 0-6, and
b is 0-1.
More specifically,
R$^1$ is C1-6 alkyl or C7-C13 arylalkylene,
R$^2$ is C1-6 alkyl,
R$^3$ is hydrogen or C1-3 alkyl,
R$^4$ and R$^5$ are each independently hydrogen, C1-3 alkyl, or C1-4 alkyl substituted with up to four —OR$^9$ groups wherein R$^9$ is a hydrogen or C1-3 alkyl,
R$^6$ is hydrogen, C1-3 alkyl, or hydroxymethylene,
R$^7$ is hydrogen, C1-4 alkyl, or C1-4 alkyl substituted with —C(O)R$^{10}$ wherein R$^{10}$ is C1-4 alkyl, or up to four —OR$^9$ groups wherein R$^9$ is a hydrogen or C1-3 alkyl,
a is 1-3, and
b is 0-1.
More specifically,
R$^1$ is C1-6 alkyl,
R$^2$ is methyl,
R$^3$, R$^4$, and R$^5$ are each independently hydrogen, C1-4 alkyl, or C1-4 alkyl substituted with 1-2 —OR$^9$ groups wherein R$^9$ is hydrogen or a C1-3 alkyl group,
R$^6$ is hydrogen,
R$^7$ is hydrogen, C1-4 alkyl, or C1-4 alkyl substituted with 1-4 —OR$^{10}$ groups wherein R$^{10}$ is hydrogen or methyl,
a is 1-3, and
b is 0-1.
Even more specifically,
R$^1$ is C1-6 alkyl,
R$^2$ is methyl,
R$^3$ is hydrogen or C1-3 alkyl,
R$^4$ is hydrogen or C1-3 alkyl,
R$^5$ is a hydrogen, C1-4 alkyl, or C1-4 alkyl substituted with 1-2 OR$^9$ groups wherein R$^9$ is a hydrogen or C1-3 alkyl,
R$^6$ is hydrogen or C1-3 alkyl,
R$^7$ is a hydrogen, C1-4 alkyl, or C1-4 alkyl substituted with 1-4 —OR$^9$ groups wherein R$^9$ is hydrogen or C1-3 alkyl,
a is 1-3, and
b is 0-1.
Even more specifically,
R$^1$ is C1-4 alkyl,
R$^2$ is methyl,
R$^3$, R$^4$, and R$^6$ are each hydrogen,
R$^5$ is hydrogen, C1-3 alkyl, or C1-3 alkyl substituted with 1-2 —OR$^9$ groups wherein R$^9$ is hydrogen or methyl,
R$^7$ is hydrogen, C1-3 alkyl, or C1-3 alkyl substituted with 1-2 —OR$^{10}$ groups wherein each R$^{10}$ is independently a hydrogen or methyl,
wherein one of R$^5$ and R$^7$ is hydrogen,
a is 1-2, and
b is 0-1.
In a specific embodiment,
R$^1$ is C1-4 alkyl,
R$^2$ is methyl,
R$^3$ is hydrogen,
R$^6$ is hydrogen or C1-3 alkyl,
R$^7$ is hydrogen, C1-3 alkyl, or C1-4 alkyl substituted with 1-2 OR$^{10}$ groups wherein R$^{10}$ is a hydrogen or C1-3 alkyl,
a is 1-2, and
b is 0.
In a specific embodiment,
R$^1$ is C1-4 alkyl,
R$^2$ is methyl,
R$^3$ is hydrogen,
R$^6$ is hydrogen, methyl, ethyl,
R$^7$ is methyl, ethyl, —CH$_2$OH, —CH$_2$OCH$_3$, or —CH$_2$OCH$_2$CH$_3$, —CH(OH)CH$_2$OH, or —(CH(OH))$_3$CH$_2$OH,
a is 2, and
b is 0.
In another specific embodiment,
R$^1$ is C1-4 alkyl,
R$^2$ is methyl,
R$^3$ is hydrogen,
R$^4$ is hydrogen, methyl, ethyl, —CH$_2$OH, or CH$_2$OCH$_3$, or —CH$_2$OCH$_2$CH$_3$,
R$^5$ is hydrogen, methyl, ethyl, —CH$_2$OH, —CH$_2$OCH$_3$, —CH$_2$OCH$_2$CH$_3$, —CH(OH)CH$_2$OH, or —(CH(OH))$_3$CH$_2$OH,
R$^6$ is hydrogen or C1-3 alkyl,
R$^7$ is hydrogen or C1-3 alkyl,
a is 2, and
b is 1.
Still more specifically, the ketal adduct of formula (1) is the glycol adduct of a levulinic acid ester having formula (1a), or the 1,2-propanediol adduct of a levulinic acid ester, having formula (1b):

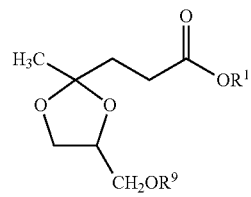
(1a)

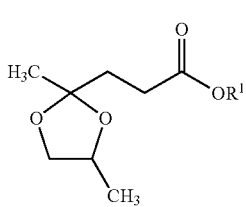

(1b)

wherein R¹ is as defined above, specifically a C1-4 alkyl, more specifically ethyl or butyl, and R⁹ is hydrogen or C1-4 alkyl. Ethyl levulinate glycerol ketal ("EtLGK") is obtained when R¹ is ethyl and R⁹ is hydrogen in formula (1a), and ethyl levulinate propylene glycol ketal ("EtLPK") is obtained when R¹ is ethyl in formula (1b).

The ketal adducts of formula (1) can be obtained by the acid-catalyzed reaction of the corresponding ketoacid ester of formula (2) with a polyol of formula (3):

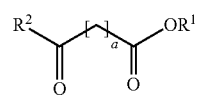

(2)

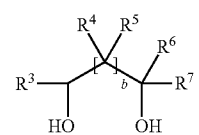

(3)

wherein each of R¹, R², R³, R⁴, R⁶, and R⁷, and the integers a and b are as defined above. Reaction conditions are described in WO 09/032,905, for example. Many of the compounds falling within the scope of formulas (2) and (3) can be bio-sourced. The ketal adducts thus provide an entry point for a broad variety of bio-sourced solvents. For example, levulinic acid is produced by the thermochemical treatment of various carbohydrates such as cellulose, which is subsequently subjected to esterification with bio-sourced alkanols and ketalization of the levulinate ester with polyhydroxy compounds such as glycerol or propylene glycol to produce a bioderived solvent.

It has been found that the ketal adducts (1), specifically (1a) and (1b), find use in water-reducible coating compositions. Without being bound by theory, it is believed that the ketal adducts function primarily as a coalescing solvent during the formation of films. However, it is to be understood that the ketal adducts can have more than one function, including one or more of solubilization, solvent coupling, surface tension reduction, viscosity reduction, and the like. In an embodiment, the ketal adducts also function as a plasticizer, increasing the flexibility of the compositions. In a highly advantageous feature, selection of the specific R¹, R², R³, R⁴, R⁶, and R⁷ groups, and a and b in the ketal adducts of formula (1) allows the chemical and physical properties of the ketal adducts to be adjusted to achieve the desired combination of properties, for example, solubilizing activity and volatility.

In a specific embodiment, the groups R¹, R², R³, R⁴, R⁶, and R⁷ groups and integers a and b are selected to provide a desired solubilizing activity, that is, the ability of the ketal adduct to solubilize a solute. Where needed, the presence of ester, ether, and hydroxyl functionality allows interaction of the ketal adduct with a variety of solute functional groups.

The ketal adducts (1), specifically (1a) and (1b), are further advantageous in that the structure of the compounds can be adjusted to alter the volatility of the compounds. Volatility manifests itself in a number of key properties for solvents, including boiling point, vapor pressure, relative evaporation rate, flammability, odor, and volatile organic compound (VOC) content. The desired volatility profile of a solvent varies considerably by application, and there are often conflicting considerations. For instance, highly volatile process solvents require less energy or time to remove after use, but in many cases also require special handling due to higher flammability. Appropriate selection of R¹, R², R³, R⁴, R⁶, and R⁷ groups, and integers a and b can further provide a selected volatility. EtLGK and EtLPK in particular are of acceptably low volatility and low flammability.

Thus, in an embodiment, a water-reducible coating composition comprises a water-reducible polymer binder, water, and a ketal adduct (1), specifically (1a) or (1b).

The polymer binder can be selected from a wide variety of polymers known in the art of water-reducible coating compositions, specifically water-reducible paint compositions, and include, for example, acrylics that are produced using traditional polymerization techniques in a water-miscible organic solvent, polyesters, polyurethanes, alkyds, silicone-modified alkyds, epoxies, epoxy esters, and alkyds. In specific embodiment, the binder is a polyurethane, for example an aliphatic polyurethane, an alkyd, an acrylic, or combinations or hybrids thereof.

The various types of polymer binders are often made water-reducible by neutralizing residual carboxylic acid groups attached to the polymer backbone with a base, for example an organic amine, ammonium hydroxide, or other base. Exemplary acrylic binders or alkyds can have acid numbers of about 20 to about 100, for example.

The polymer binder can be thermosetting, in which case any curing agent utilized for each polymer binder will depend on the nature of the particular polymer and its curing mechanism. Thus, for the polyester and alkyd polymers having hydroxyl, carboxyl or amide functionality or any combination of such functionalities, cross-linking or curing can be effected by means of urea formaldehyde, melamine formaldehyde and methoxylated, ethoxylated or butoxylated forms thereof. Blocked isocyanate crosslinking agents are also known in the art. Catalysts can also be used to promote the curing reaction, such as peroxides. In addition to catalysts, promoters and activators for promoting the curing reaction can be used.

Some polymer binders, e.g., curable polyurethane binders, include two components: an aqueous component including an active hydrogen-containing component (i.e., a polyol or amino-functional compound) in one part and an aqueous polyisocyanate in another part. The polyol can be a soluble or water-dispersible polyol, optionally having a carboxyl group, or a hydroxy- and/or amino-functional oligourethane, and the polyisocyanate can be modified with polyoxyalkylene ether alcohol to be water-soluble or water dispersible.

Epoxy binders include derivatives of diglycidyl ether/bisphenol compounds such as bisphenol A (DGEBA), i.e., derivatives of polyether diepoxides that are obtained from the polymeric adduction of bisphenols with the diglycidyl ether of the bisphenol. The epoxies can be rendered water-soluble by reacting them with phosphoric acid and then neutralizing the resulting, acidic, ester, and glycol-comprising reaction products with a base. If the base is a fugitive base, such as ammonia or a volatile amine, the water-thinned, neutralized polymer can be converted to a water-insensitive, high performance thermoset polymer binder by evaporating the water, heating to disrupt the ammonium salt groups and drive off the ammonia (or amine), and curing. Conventional curing agents capable of reacting with acidic and/or alcoholic hydroxyl groups may be incorporated with the uncured polymer. Epoxy binders can also be made with a surfactant to aid in dispersion. In some cases, the surfactant can have reactive groups so that the surfactant is chemically incorporated into the polymer system.

The water-reducible polymer binder can be present in water completely dissolved, i.e., in the form of a solution, in the form of aggregates, or an aqueous dispersion, and can include about 5 to about 85 weight percent (wt. %) solids, specifically about 10 to about 75 wt. % solids (i.e., the weight percentage of the polymer binder based on the total weight of the water-reducible coating composition). As used herein, "solids" refers to the 100% binder in whatever form, such as a solid or liquid. The polymer binder can be present in a wide variety of particle sizes, for example a mean polymer binder particle size from about 10 to about 1,000 nanometers (nm), specifically about 50 to about 800 nm. The particle size distribution can be mono-modal or multimodal, for example bimodal.

The ketal adduct (1), specifically (1a) or (1b), is present in the water-reducible coating composition in an amount effective for its purpose, i.e., coalescence of a film, solubilization, and the like. Such amounts can be determined by one of ordinary skill in the art, and can be for example, from about 0.1 to about 30 wt. %, or 0.5 to about 30 wt. %, specifically about 1 to about 20 wt. % or about 1 to about 10 wt. %, each based on the total weight of the water-reducible coating compositions. The balance of the water-reducible coating compositions is water, polymer binder, and other optional additives, including cosolvents known in the art.

A method of preparing a water-reducible coating composition comprises combining the polymer binder, the ketal adducts (1), specifically (1a) and/or (1b), aqueous phase (i.e., water and any cosolvents if present), and any additives, if present, to form a water-reducible coating composition. The components can be added in any suitable order to provide the water-reducible coating composition. In an embodiment, the polymer binder is combined with the ketal adduct after synthesis of the polymer binder is complete. In this embodiment, the ketal adduct can be added to the polymer binder or water before the binder is combined with the water to form the coating composition. Addition of the ketal adduct to the polymer binder prior to adding the combination to water can improve processing due to a decrease in the viscosity of the combination. Alternatively, the ketal adduct can be combined added after the binder is combined with the water. Where the binder is neutralized, the ketal adduct can be combined with the binder before neutralization or after neutralization. In an embodiment, the ketal adduct and polymer binder are combined after the binder is neutralized, to prevent side reaction of the ketal adduct and the base used for neutralization.

In another embodiment, the ketal adduct is present during polymerization of the polymer binder in the nonaqueous solvent. In this embodiment, the ketal adduct can function as a solvent or a cosolvent during polymerization, and optionally as a cosolvent during dispersal of the polymer binder in water and/or as a coalescent during coating. Ketal adducts wherein $R^5$ and $R^7$ are not substituted with a hydroxy group, and LPK in particular, can be used as a solvent or cosolvent during polymerization to prevent hydroxyl groups on the solvent from reacting and becoming detrimental to the binder properties.

The amount of the ketal adduct used during polymerization will depend on the particular monomers or oligomers used for the polymerization, whether the ketal adduct acts as a solvent or cosolvent, and like considerations, and can be readily determined by one of ordinary skill in the art without undue experimentation. After polymerization, the ketal adduct can be fully or partially removed, or additional ketal adduct can be added to aid in mechanical dispersion and/or act as a coalescing agent. One ketal adduct can be used during polymerization (e.g., a ketal adduct wherein $R^5$ and $R^7$ are not substituted with a hydroxy group, and EtLPK in particular), and another type of ketal adduct can be used during dispersion and/or as a coalescing agent (e.g., a ketal adducts containing one or more hydroxyl groups, such as EtLGK).

In a specific embodiment, the ketal adducts (1), specifically (1a) or (1b), are used in water-reducible paint compositions, stain composition, or clear-coat compositions, and can reduce or replace other organic solvents in the water-reducible compositions. EtLPK in particular can be used as a green/non-toxic coalescing solvent in water-reducible paint, stain, or clear-coat compositions, and in particular such compositions used in architectural and light industrial applications. Because EtLPK evaporates more slowly than water, drying time is slower. However, the volatility of EtLPK is such that none or very little remains in the fully dried film, thereby avoiding a tacky film.

Thus, in an embodiment, a water-reducible paint, stain, or clear-coat composition comprises a water-reducible polymer binder composition, water, optionally a pigment, and a ketal adduct (1), specifically (1a) or (1b). A wide variety of water-reducible polymer binders can be used, including those described above. When the polymer binder is thermosetting, the binder compositions comprise the uncured polymer and one or more of a curing agent, catalyst, initiator, or promoter, if used.

A pigment can be present in the water-reducible paint or stain composition. The term "pigment" as used herein includes non-film-forming solids such as extenders and fillers, for example an inorganic pigment aluminum oxide, barites (barium sulfate), $CaCO_3$ (in both ground and precipitated forms), clay (aluminum silicate), chromium oxide, cobalt oxide, iron oxides, magnesium oxide, potassium oxide, silicon dioxide, talc (magnesium silicate), $TiO_2$ (in both anastase and rutile forms), zinc oxide, zinc sulfite, an organic pigment such as solid (high Tg) organic latex particles added to modify hardness or (as in the case of hollow latex particles) to replace $TiO_2$, carbon black, and a combination comprising at least one of the foregoing. Representative combinations include blends of metal oxides such as those sold under the marks Minex® (oxides of silicon, aluminum, sodium and potassium commercially available from Unimin Specialty Minerals), Celite® (aluminum oxide and silicon dioxide commercially available from Celite Company), Atomites® (commercially available from English China Clay International), and Attagels® (commercially available from Engelhard). Specifically, the pigment includes $TiO_2$, $CaCO_3$, or clay.

Generally, the mean particle sizes of the pigments are about 0.01 to about 50 micrometers. For example, the $TiO_2$ particles used in the aqueous coating composition typically have a mean particle size from about 0.15 to about 0.40 micrometers. The pigment can be added to the aqueous coating composition as a powder or in slurry form.

A dye can be present in the water-reducible paint or stain composition, in addition to or instead of a pigment. The term "dye" as used herein includes organic compounds generally soluble in the compositions, and that impart color to the compositions.

The water-reducible paint, stain, or clear-coat composition can contain additional additives, as known in the art, to modify the characteristics of the water-reducible composition, provided that the additives do not significantly adversely affect the desired properties of the paint, stain, or clear-coat, for example, viscosity, drying time, or other characteristic. These additives can include a plasticizer, drying retarder, dispersant, surfactant or wetting agent, rheology modifier, defoamer, thickener, biocide, mildewcide, colorant, wax, perfume, pH adjuster, or cosolvent. The additives are present in the amount ordinarily used in water-reducible paint, stain, or clear-coat compositions. In an embodiment, the water-reducible paint, stain, or clear-coat composition consists essentially of a water-reducible polymer binder, water, an optional pigment, an optional dye, and a ketal adduct (1), specifically (1a) and/or (1b). As used herein, the phrase "consists essentially of" encompasses the water-reducible polymer binder, water, optional pigment, and ketal adduct, and optionally one or more of the additives defined herein, but excludes any additive that significantly adversely affects the desired properties of the water-reducible composition or the dried coating derived therefrom.

The water-reducible polymer binder can be present in the water-reducible paint composition in an amount from about 2 to about 60 wt. %, and more specifically about 4 to about 40 wt. % of the water-reducible paint composition, based on the dry weight of the polymer water-reducible binder.

When present, the pigment can be used in the water-reducible paint composition in an amount from about 2 to about 50 wt. %, specifically about 5 to about 40 wt. % of the total solids in the water-reducible paint composition.

The water-reducible polymer binder can be present in the water-reducible stain composition in an amount from about 0.1 to about 50 wt. %, and more specifically about 0.5 30 wt. % of the water-reducible stain composition, based on the dry weight of the polymer water-reducible binder.

When present, the pigment or dye can be used in the water-reducible stain composition in an amount from about 0.1 to about 40 wt. %, specifically about 0.5 to about 30 wt. % of the total solids in the water-reducible stain composition.

When present, the dye can be used in the water-reducible paint or stain composition in an amount from about 0.001 to about 10 wt. %, specifically about 0.005 to about 5 wt. % of the total solids in the water-reducible paint or stain composition.

The ketal adduct (1), specifically 1(a) and/or 1(b), more specifically 1(b), can be present in an amount from about 0.1 to about 30 wt. %, specifically about 1 to about 10 wt. %, more specifically about 1 to about 8 wt. %, and still more specifically about 1 to about 7 wt. %, based on the dry weight of the polymer binder.

The water-reducible paint composition can include about 5 to about 85 wt. % and more specifically about 35 to about 80 wt. % water, i.e., the total solids content of the water-reducible paint composition can be about 15 to about 95 wt. %, more specifically, about 20 to about 65 wt. % of the total composition. The compositions can be formulated such that the hardened (dried) coatings comprise at least about 2 to about 98 volume % (vol. %) polymer solids and, if present, the ketal adduct (1), specifically (1a) and/or (1b), and about 2 to about 98 vol. % of non-polymeric solids in the form of pigments or a combination of a pigment and a dye, together with other additives (if present).

The water-reducible stain composition can includes about 10 to about 95 wt. % and more specifically about 25 to about 90 wt. % water, i.e., the total solids content of the water-reducible stain composition can be about 5 to about 75 wt. %, more specifically about 10 to about 75 wt. % of the total composition. The stain compositions are typically formulated such that the hardened (dried) coatings comprise at least about 1 vol. %, for example about 5 to about 98 vol. % polymer solids, if present, the ketal adduct (1), specifically (1a) and/or (1b), and about 0.1 to about 99 vol. % of non-polymeric solids in the form of pigments and/or dyes, and other additives (if present). A wood stain coating can penetrate the wood substrate to some degree.

The water-reducible clear-coating composition can include about 10 to about 95 wt. % and more specifically about 25 to about 90 wt. % water, i.e., the total solids content of the water-reducible clear-coating composition can be about 5 to about 75 wt. %, more specifically, about 10 to about 75 wt. % of the total composition. The compositions are typically formulated such that the hardened (dried) clear-coatings comprise at least about 1 vol. % polymer solids, for example about 1 to about 100 vol. % polymer solids, if present, the ketal adduct (1), specifically (1a) and/or (1b), and 0 to about 10 vol. % of non-polymeric solids. For example, in clear-coat compositions certain additives (e.g., calcium carbonate, talc, or silica) can be used that do not impart color, but rather serve primarily to reduce formulation cost, modify gloss levels, or the like.

In an embodiment, a method of preparing a water-reducible paint, stain, or clear-coating composition comprises combining the polymer binder, the ketal adducts (1), specifically (1a) and/or (1b), the pigment (if used), water, and any optional additives to form a water-reducible composition. The components can be added in any suitable order to provide the water-reducible composition. In an embodiment, the ketal adduct is present during polymerization of the polymer binder. In this embodiment, as described above, the ketal adduct can function as a cosolvent during polymerization (and/or as a coalescent during coating). In another embodiment, as described above, the polymer binder is combined with the ketal adduct after synthesis of the polymer binder is complete. In this embodiment, the ketal adduct can be added to the polymer binder or water before the binder is combined with the water, or added after the binder is combined with the water. In the case of water-reducible paint compositions, the aqueous coating composition has a pH from 5 to 8.5.

In another embodiment, the components of the water-reducible coating composition, e.g., a paint, stain, or clear-coat composition, are provided in two parts that are combined immediately prior to use. For example, a first part of an epoxy water-reducible coating composition includes an epoxy dispersion and a second part includes an amine crosslinker. The parts are mixed in a predetermined ratio to provide the epoxy system. The ketal esters and other additives are generally present in the epoxy dispersion. Similarly, a first part of a water-reducible alkyd composition includes an alkyd binder, and a second part includes a melamine crosslinker In another embodiment, the components of the water-reducible coating composition, e.g., a paint, stain, or clear-coat composition, are provided in two parts that are combined immediately prior to use. For example, a first part of polyurethane water-reducible coating composition includes hydroxyl functional polyurethane dispersion and a second part includes an isocyanate prepolymer. The parts are mixed in a predetermined ratio to provide the polyurethane system. The ketal esters and other additives are generally present in the polyurethane dispersion.

In another exemplary embodiment, a method of use, that is, coating a substrate with the water-reducible paint, stain, or clear-coat composition is described. The method comprises contacting a surface of the substrate with the water-reducible paint, stain, or clear-coat composition to form a film; and drying the film to harden the film. The water-reducible composition can at least partially impregnate the substrate after contacting. The film can further optionally be cured.

The substrate can be a wide variety of materials, including but not limited to, paper, wood, concrete, metal, glass, textiles, ceramics, plastics, plaster, roofing substrates such as asphaltic coatings, roofing felts, foamed polyurethane insulation, polymer roof membranes, and masonry substrates such as brick, cinderblock, and cementitious layers, including EIFS systems (synthetic stucco made from engineered layers of polystyrene insulation with a cement-like mud called a topcoat or basecoat, and which is applied with a trowel). The substrates include previously painted, primed, undercoated, worn, or weathered substrates.

The aqueous coating composition can be applied to the materials by a variety of techniques well known in the art such as, for example, curtain coating, brush, rollers, mops, air-assisted or airless spray, electrostatic spray, and the like. Paints and clear-coats may or may not partially penetrate, i.e., partially impregnate the substrate upon coating. In an embodiment, a water-reducible paint composition does not substantially penetrate or impregnate the substrate. In another embodiment, a water-reducible clear-coat composition does not substantially penetrate or impregnate the substrate. Stains are generally designed to partially or fully impregnate the substrate upon coating. In embodiment, the substrate is fully impregnated by the water-reducible stain composition, such that the film formed conforms to the interior of the coated substrate, and may be continuous or discontinuous.

Hardening can be by drying, for example storage under atmospheric conditions at room temperature. Drying can also include solvent wicking, for example by the substrate itself (e.g., wood or paper). Heat can be used as an aid to drying. Curing can be used to further harden the film. Curing may be carried out before drying, during drying, or after drying, or any combination thereof.

According to another embodiment, a substrate coated with a dried water-reducible coating is provided, wherein the dried water-reducible coating, substrate, or combination thereof comprises the water-reducible polymer binder in the form of a film. The film can be a paint, a stain, or a clear-coat. After drying, some amount of a ketal adduct (1) can be present in the film, in the substrate (by impregnating the substrate), or both. In an embodiment, the ketal adduct can be chemically combined with the polymer binder. For example, ketal adducts (1), specifically (1a) and/or (1b) can be present in the coating in an amount from about 1 part per million by weight (ppm) to about 15 wt. %, specifically about 0.1 to about 15 wt. %, each based on the total weight of the dried coating. For example, where the ketal adduct performs a plasticizing function, the adduct can be present in higher amounts, for example about 0.25 to about 15 wt. %, based on the total weight of the dried coating. The dried water-reducible coating can be disposed on a surface of the substrate, in the form of a film that can partially or completely cover the surface. The coating can be disposed directly on the surface, or one or more intermediate layers (e.g., a primer) can be present between the coating and the surface of the substrate. In addition, or alternatively, as described above, the coating can be partially or fully impregnated into the substrate and conform to interior surfaces of the substrate. In these embodiments, ketal adducts (1), specifically (1a) and/or (1b) can be present in the in the coating in an amount from about 1 part per million by weight to about 15 wt. %, %, specifically about 0.1 to about 15 wt. %, each based on the total weight of the dried coating. Again, where the ketal adduct performs a plasticizing function, the adduct can be present in higher amounts, for example about 0.25 to about 15 wt. %, based on the total weight of the dried coating. In any of the foregoing embodiments, it is also possible to dry the coating and/or substrate sufficiently to remove ketal adducts (1), specifically (1a) and/or (1b) to below detectable limits in the films.

The water-reducible coating compositions exhibit comparable or improved coalescence compared to otherwise similar compositions that do not have the ketal adducts (1), specifically (1a) and/or (1b).

Furthermore, the water-reducible paint compositions can have very good overall performance, in particular one or more of viscosity, dry times, sag resistance, flow and leveling, hardness, specular gloss, dry film adhesion, impact flexibility, dilute alkali resistance, water resistance, stain resistance, solvent resistance, hydraulic fluid resistance, weatherability, and good heat storage stability.

The following non-limiting examples further illustrate various embodiments of the invention.

EXAMPLES

Example 1

EtLGK and EtLPK were characterized and compared with various known solvents, in particular ethylene glycol butyl ether (EGBE), dipropylene glycol methyl ether (DPM), propylene glycol methyl ether acetate (PMA), dibasic esters (DBE), d-limonene (DL), and soy methyl esters (SME).

Solubility studies with polymers shows the solvating effectiveness of the ketal adducts (1), specifically (1a) and (1b). In these experiments, solubility observations were made after 0.5 g polymer binder and 4.5 g solvent were agitated for 24 hours at room temperature. Solubility ratings ranged from 1 (complete solubility) to 6 (no effect) based on visual observations.

TABLE 1

|  | EGBE | DPM | PMA | DBE | DL | SME | EtLGK | EtLPK |
|---|---|---|---|---|---|---|---|---|
| Paraloid ™ B-72 (Dow) | 1 | 1 | 1 | 1 | 4 | 5 | 2 | 1 |
| Paraloid ™ B-82 (Dow) | 1 | 1 | 1 | 1 | 3 | 6 | 2 | 1 |
| Desmocoll ® 176 (Bayer) | 4 | 4 | 1 | 2 | 5 | 4 | 4 | 2 |
| Desmocoll ® 406 (Bayer) | 3 | 2 | 1 | 1 | 4 | 5 | 4 | 2 |
| CAP-482-0.5 (Eastman) | 2 | 2 | 1 | 1 | 6 | 6 | 2 | 1 |
| DER ™-661 (Dow) | 1 | 1 | 1 | 1 | 5 | 5 | 2 | 1 |
| EPON ™ 1001F (Momentive) | 1 | 1 | 1 | 1 | 5 | 3 | 1 | 1 |
| UCAR PKHH ™ (Phenoxy) | 1 | 1 | 2 | 1 | 6 | 6 | 5 | 1 |
| Butvar ® B-76 (Solutia) | 1 | 1 | 1 | 1 | 4 | 4 | 3 | 2 |
| Polyvinyl Acetate | 3 | 1 | 1 | 1 | 6 | 6 | 2 | 1 |

Solubility was based on visual observation of the solvent-polymer mixture using the following rating scheme:
1 = completely soluble,
2 = almost soluble,
3 = strongly swollen/slightly soluble,
4 = swollen,
5 = little swelling,
6 = no visible effect.

The data in Table 1 show that EtLPK dissolves a variety of common polymers, with performance similar to petroleum-based solvents ethylene glycol butyl ether, dipropylene glycol methyl ether, propylene glycol methyl ether acetate, and dibasic esters. Both EtLGK and EtLPK significantly outperformed the bio-sourced solvents soy methyl esters and d-limonene in their ability to dissolve common polymers.

Hildebrand solubility parameters were determined from the heat of vaporization and molar volume of each of EtLGK and EtLPK and are shown in Table 2. The higher value for EtLGK reflects the presence of a hydroxyl group.

TABLE 2

| Solvent | Hildebrand Solubility Parameter (MPa$^{1/2}$) |
|---|---|
| EtLGK | 18.6 |
| EtLPK | 16.9 |

FIG. 1 shows the ability of four solvents (EtLGK, propylene glycol methyl ether (PM), ethylene glycol butyl ether (EGBE), and dipropylene glycol methyl ether (DPM)) to couple aqueous mixtures of four water-immiscible liquids: (a) isobutyl isobutyrate (IBIB), (b) castor oil, (c) soy oil methyl esters, and (d) 2,2,4-trimethyl-1,3-pentanediolmono (2-methylpropanoate) ("TMP", available under the trademark TEXANOL® from Eastman). The data in FIG. 1 shown that EtLGK homogenizes the systems studied. EtLGK becomes less efficient as the water-immiscible liquid becomes more non-polar, to the point of failing to couple aliphatic hydrocarbons and nonpolar oils due to the lack of miscibility. EtLGK therefore offers a viable alternative to glycol ethers for many coating systems. One of the particularly surprising results in the experiments further described below that our experiments was the EtLPK, which is not miscible with water at quantities greater than about 3 volume %, can aid solubilization of a polymer binder in water.

Figure 2:
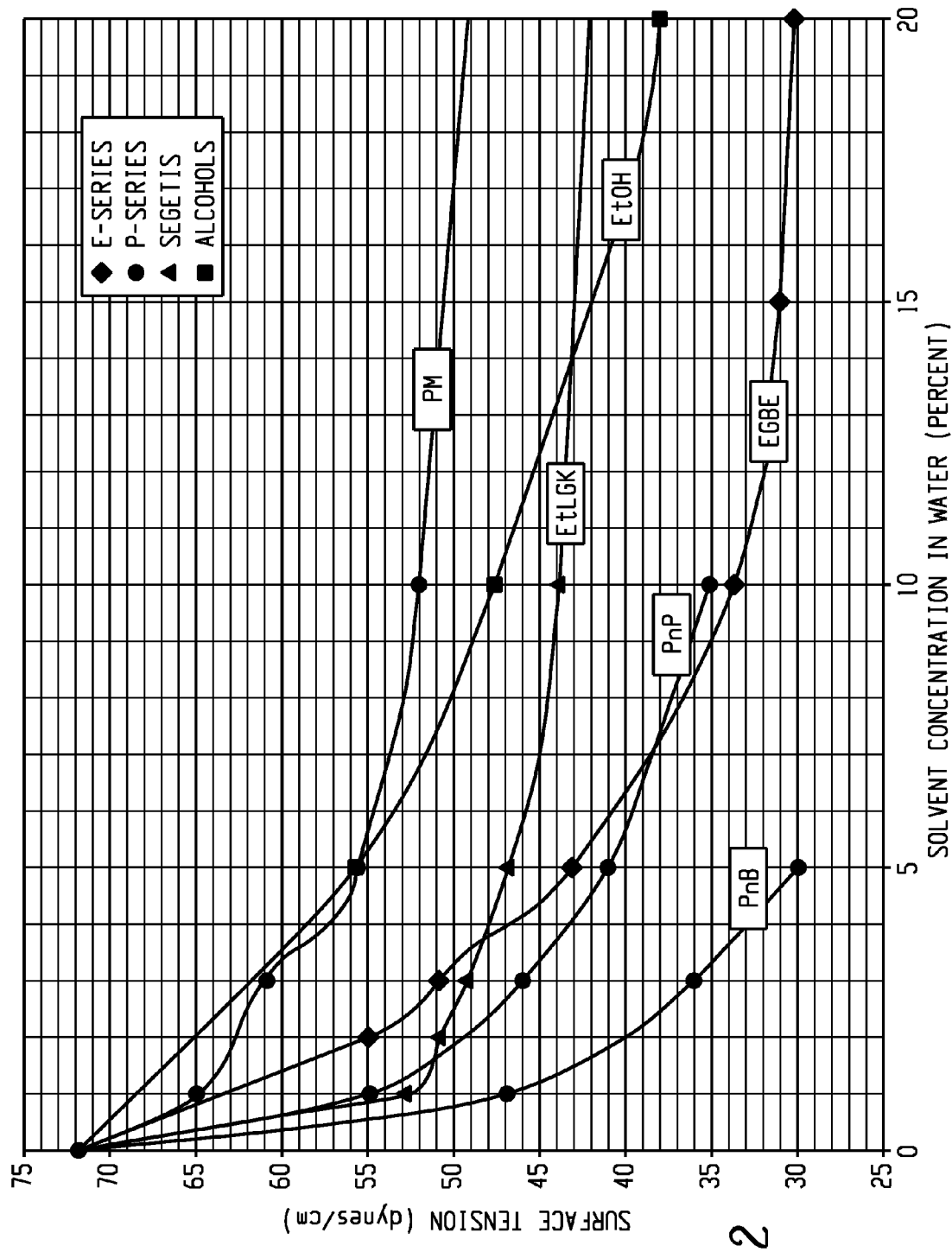
FIG. 2 is a graph showing the surface tension of water as a function of cosolvent concentration.

FIG. 2 shows a graph of surface tension vs. solvent concentration in water for a variety of solvents (propylene glycol methyl ether (PM); propylene glycol n-propyl ether (PnP); propylene glycol n-butyl ether (PnB); ethylene glycol butyl ether (EGBE); ethanol (EtOH)). As can be seen from FIG. 2, EtLGK reduces surface tension of water with efficiencies similar to common glycol ethers and alkanols.

Figure 3:
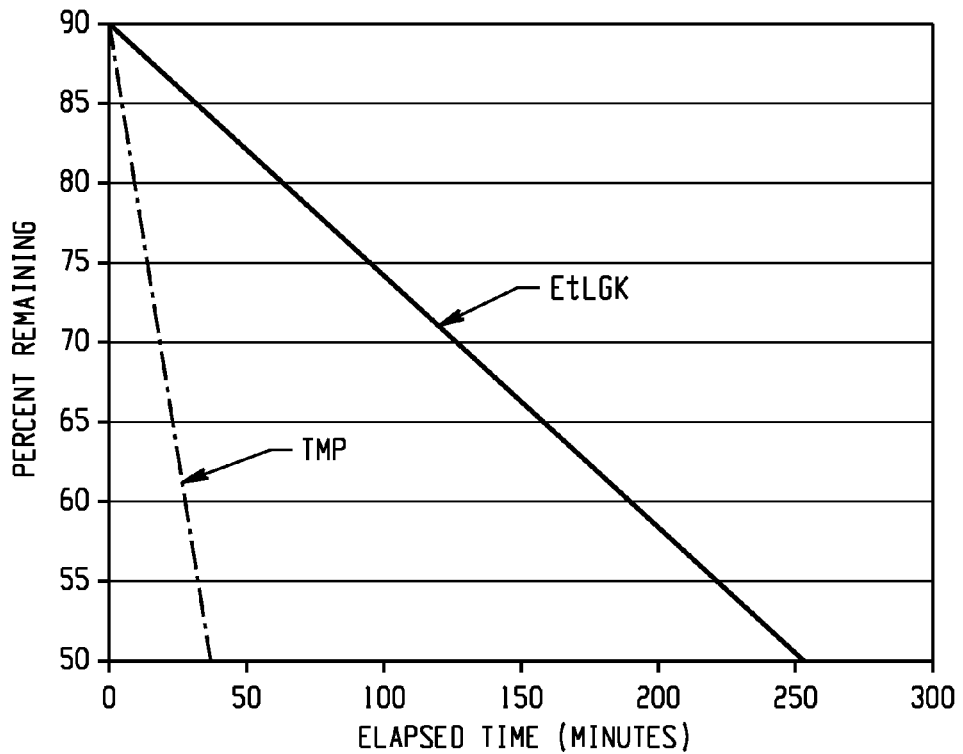
FIG. 3 is a graph showing the weight loss of EtLGK and TMP in an open TGA pan at 110° C., where the weight loss rate shown is between 90% and 50% of the original weight.

The volatility of EtLGK was studied by open-air and TGA (thermogravimetric analysis) experiments as shown in FIG. 3. As can be seen from FIG. 3, at room temperature, about 40% of EtLGK evaporated over 80 days, and at 110° C., 31.5% of EtLGK evaporated in one hour. Measuring weight loss by TGA at 110° C. showed that EtLGK volatilized about seven times more slowly than TMP.

Figure 4:
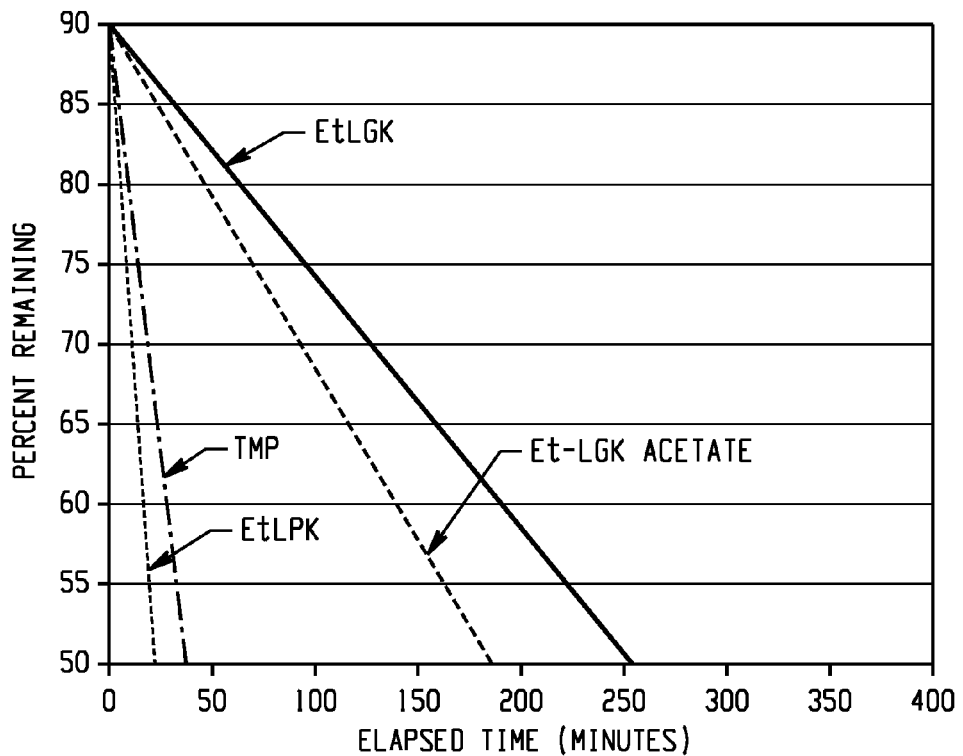
FIG. 4 is a graph showing the weight loss of EtLGK, EtLGK-acetate, EtLPK, and TMP in an open TGA pan at 110° C., where the weight loss rate shown is between 90% and 50% of the original weight.

The volatility of EtLPK, EtLGK, and EtLGK-acetate was tested relative to TMP as shown in FIG. 4 and Table 3. Volatility was determined at 110° C. in open TGA pan.

TABLE 3

| Solvent | Relative Volatility (TMP = 1) |
|---|---|
| TMP | 1.0 |
| EtLGK | 0.15 |
| EtLGK acetate | 0.20 |
| EtLPK | 1.50 |

The data in Table 3 show that EtLGK acetate is only slightly more volatile than EtLGK (relative volatility vs. TMP=0.20), while EtLPK is more volatile than TMP (relative volatility vs. TMP=1.5).

Example 2

This example evaluated use of EtLGK as a coalescing agent for a polyurethane dispersion. The polyurethane dispersion was a one-part formulation Hauthane™ HD 4669 from Hauthaway. The comparative examples are glycol ether DPM and a material known to produce a high degree of film formation and plasticizing effects for organic solvent-free polyurethane dispersion, tributoxyethyl phosphate, available from Chemtura under the designation KP-140.

The formulations and results are shown in Table 4. Pencil hardness was determined by scribing the cured coating with pencils of defined hardness (6B to 6H and F). The reported pencil hardness value was the softest pencil that marred the film. In the test for resistance to deionized water (De-I Water Resistance), a 45-minute covered spot test, "0" denotes partial removal or severe softening, and "1" denotes 8F blisters and softening.

TABLE 4

| | Parts by Weight | | | |
|---|---|---|---|---|
| Material | (1) | (2) | (3) | (4) |
| Hauthane ™ HD 4669 | 100.0 | 100.0 | 100.0 | 100.0 |
| KP-140 ® | — | 2.5 | — | — |
| EtLGK | — | — | 2.5 | — |
| Glycol Ether DPM | — | — | — | 2.5 |
| | 100.0 | 102.5 | 102.5 | 102.5 |
| Physical Properties | | | | |
| Film Appearance | Fails to fully coalesce | Excellent | Excellent | Slightly incompatible |
| Hardness Development | | | | |
| 24 Hours | HB | HB | HB | HB |
| 1 Week | HB | HB | F | F |
| 2 Weeks | HB | HB | F | F |
| 60° Gloss | | | | |
| 24 Hours | 132.0 | 130.4 | 132.9 | 128.2 |
| 2 Weeks | 132.0 | 130.4 | 131.2 | 128.0 |
| 20° Gloss | | | | |
| 24 Hours | 102.2 | 99.2 | 101.8 | 97.1 |
| 2 Weeks | 102.1 | 99.2 | 101.7 | 95.5 |
| Impact Resistance (in/lbs) | | | | |
| Direct | 15 | 160 | 145 | 15 |
| Reverse | <10 | 160 | 130 | <10 |
| Dry Film Adhesion | 5B | 5B | 5B | 5B |
| De-I Water Resistance | 0 | 1 | 1 | 0 |

From this data in Table 4, it can be seen that EtLGK offers comparable performance relative to the KP-140® standard. It provides improved dry film flexibility, which is an important property in many films, especially paints. This is significant given that the tributoxyethyl phosphate is the only coalescent/plasticizer known to work well in this application. It can further be concluded that the ketal esters may have greater utility in higher Tg, solvent-free or low solvent polyurethane dispersions.

Example 3-7

Examples 3-7 evaluated the use of EtLGK and EtLPK as a coalescing agent for a one-part polyurethane dispersion, Hauthane™ HD 4669 from Hauthaway, which is a co-solvent free, aliphatic polyester polyurethane dispersion at 38% solids (±1%) that provides a hard coating, and is designed for topcoat applications on a wide variety of substrates, including concrete, metal, plastic, and wood.

Compositions with Hauthane® HD-4675 were mixed by hand according to the examples in Table 5. Films were drawn onto polished steel panels (Q-Panel® from Q-Lab) with a drawdown bar with a thickness of 5 mil (127 micrometer). The panels were left on the bench to dry at room temperature. "Dry to touch time" is the elapsed time between drawdown and the time at which a lightly depressed finger no longer leaves a fingerprint or smudge on the coating.

TABLE 5

| Example | Solvent | Wt. % Solvent | Wt. % Hauthane ® HD-4675 | Dry to Touch Time (min.) |
|---|---|---|---|---|
| 3 | None | 0 | 100 | 12 |
| 4 | EtLPK | 5 | 95 | 16 |
| 5 | EtLGK | 5 | 95 | 23 |
| 6 | TMP | 5 | 95 | 18 |
| 7 | Butyl Cellosolve* | 5 | 95 | 23 |

*2-Butoxyethanol (The Dow Chemical Company).

In addition to the data in Table 5, it was observed that without the use of a solvent (Example 3), the polyurethane dispersion exhibited heavy wrinkling upon drying. Examples 4-7 formed dried films with smooth finishes. The results further show that EtLGK had a comparable dry to touch time as Butyl Cellosolve™ (2-butoxyethanol from Dow), while EtLPK had a faster dry to touch time than Butyl Cellosolve™ and is comparable to TMP.

Examples 8-9

Examples 8-9 evaluated the use of EtLGK and EtLPK as a coalescing agent for a one-part polyurethane dispersion, Hauthane® HD-4669 (from Hauthaway), a cosolvent-free, aliphatic, aqueous polyurethane dispersion at 40% solids (±1%) that forms a hard coating wherein heat curing is recommended, and is designed for topcoat applications on a wide variety of substrates, including concrete, metal, plastic, and wood, either as a sole vehicle or blended with acrylic emulsions.

In Example 8, Hauthane® HD-4669 (95 wt. %) was mixed by hand with EtLPK (5 wt. %). A film was drawn on polished steel panels (Q-Panel® from Q-Lab) with a drawdown bar with a thickness of 5 mil (127 micrometer). The panel was cured in an oven at 130° C. for 20 minutes. After the oven cure, the compositions formed a hard, smooth film.

In Example 9A, Hauthane® HD-4669 (95 wt. %) was mixed by hand with EtLGK (5 wt. %). A film was drawn onto polished steel panels (Q-Panel® from Q-Lab) with a drawdown bar with a thickness of 5 mil (13 micrometer). The panel was left on the benchtop to dry and cure at room temperature. The compositions formed a hard, smooth film.

In Example 9B, Hauthane® HD-4669 (95 wt. %) was mixed by hand with EtLPK (5 wt. %). A film was drawn onto polished steel panels (Q-Panel® from Q-Lab) with a drawdown bar with a thickness of 5 mil (13 micrometer). The panel was left on the benchtop to dry and cure at room temperature. The compositions formed a hard, smooth film.

Examples 10-15

Examples 10-15 evaluated the use of EtLGK and EtLPK as a compatibilizing co-solvent and coalescing agent for epoxy coatings.

Example 10: EPON® 828 (50 wt. %; from Momentive, an undiluted, difunctional bisphenol A/epichlorohydrin liquid epoxy polymer binder) and water (50 wt. %) were mixed by hand shaking at room temperature (72° F.) for approximately 1-2 minutes. The polymer binder remained insoluble in the water.

Example 11: EPON® 828 (50 wt. %) and EtLPK (50 wt. %) were mixed by hand shaking at room temperature (72° F.) for approximately 1-2 minutes. Example 11 formed a homogeneous mixture with no visible signs of incompatibility.

Example 12: EPON® 828 (50 wt. %) and EtLGK (50 wt. %) were mixed by hand shaking at room temperature (72° F.) for approximately 1-2 minutes. Example 12 formed a homogeneous mixture with no visible signs of incompatibility.

Example 13: EPON® 828 (25 wt. %), EtLPK (25 wt. %), and water (50 wt. %) were mixed by hand shaking at room temperature (72° F.) for approximately 1-2 minutes. The polymer binder was easily dispersible with agitation. However, the polymer binder separated upon storage, indicating that further stabilization is desirable.

Example 14: EPON® 828 (25 wt. %), EtLGK (25 wt. %), and water (50 wt. %) were mixed by hand shaking at room temperature (72° F.) for approximately 1-2 minutes. The polymer binder was easily dispersible with agitation. However, the polymer binder separated upon storage, indicating that further stabilization is desirable.

Example 15: EPON® 828 (25 wt. %) and water (75 wt. %) were mixed by hand shaking at room temperature (72° F.) for approximately 1-2 minutes. The polymer binder remained insoluble in the water.

Examples 16-20

Examples 16-20 evaluated the use of EtLGK and EtLPK as a coalescing agent for water-reducible epoxy coatings.

Example 16: Beckopox® EP122W (50 wt. %; from Cytec, a water-emulsifiable Bisphenol A/Bisphenol F epoxy delivered as 100% polymer binder) and EtLGK (50 wt. %) were mixed by hand at room temperature. The mixture was homogeneous with no visible signs of incompatibility.

Example 17: Beckopox® EP122W (50 wt. %) and EtLPK (50 wt. %) were mixed by hand at room temperature. The mixture was homogeneous with no visible signs of incompatibility.

Example 18: Beckopox® EP122W (50 wt. %) was easily dispersed in water (50 wt. %).

Example 19: Beckopox® EP122W (3.3 g) and 3.3 g of water were mixed by hand for 1-2 minutes and then epoxy hardener (3.3 g; Beckopox® EH623W from Cytec, a waterborne polyamine adduct hardener, delivered as 80% nonvolatiles) was added and mixed by hand for an additional 1-2 minutes. The film was drawn down on polished steel panels (Q-Panel® from Q-Lab) at 3 mm wet thickness and cured in the oven for 20 minutes at 130° C. The resulting film was a hard, smooth coating. An orange peel effect was observed, but this can be overcome with additives known to those skilled in the art.

Example 20: Beckopox EP122W (2.85 g), 0.3 g of EtLPK, and 3 g of water were mixed by hand for 1-2 minutes and then epoxy hardener (2.85 g; Beckopox® EH623W) was added and mixed by hand for an additional 1-2 minutes. The film was drawn down on polished steel panels (Q-Panel brand from Q-lab) at 3 mil (76 micrometer) wet thickness and cured in the oven for 20 minutes at 130° C. The resulting film was a hard, smooth coating. Although an orange peel effect was observed, it is known in the art that this effect can be eliminated with additives known to those skilled in the art.

Examples 21-27

Examples 21-27 evaluated the use of EtLGK and EtLPK as a compatibilizing co-solvent and coalescing agent for an alkyd polymer binder that is not neutralized.

Duramac® WR216-3610 (from Momentive) is described as a water-dispersible alkyd polymer binder delivered at 98% non-volatile content by weight. It is a viscous, amber-colored liquid at room temperature. The alkyd is based on linseed oil and tung oil and has a reported acid number of 85. Compositions using Duramac® WR216-3610 as-received without neutralization were prepared according the examples in Table 6.

TABLE 6

| Example | Solvent | Wt. % Solvent | Wt. % Duramac® WR216-3610 | Wt. % Water |
|---|---|---|---|---|
| 21 | None | 0 | 50 | 50 |
| 22 | EtLPK | 2.5 | 47.5 | 50 |
| 24 | EtLPK | 7.5 | 42.5 | 50 |
| 24 | Butyl Cellosolve® | 7.5 | 42.5 | 50 |
| 25 | EtLPK | 25 | 25 | 50 |
| 26 | EtLGK | 50 | 50 | 0 |
| 27 | EtLPK | 50 | 50 | 0 |

Examples 21 and 22 formed immiscible mixtures. By increasing the amount of EtLPK to 7.5 wt. % and decreasing the polymer binder content to 42.5 wt. %, it was possible to easily disperse the liquid polymer binder into medium-sized droplets (example 23). The comparative example with Butyl Cellosolve® (example 24) was more difficult to disperse and the mixture made an oily, milky solution. In Example 25, the polymer binder was easily dispersed into tiny droplets. Examples 26 and 27 formed clear, amber liquids with no visible signs of a separate phase. Example 27 had a lower viscosity than example 26.

Examples 28-31

Examples 28-31 evaluated the use of EtLPK and EtLGK as a compatibilizing co-solvent and a coalescing agent for an alkyd polymer binder that was neutralized. Thus, in the following examples, triethylamine (TEA) was added in an amount sufficient to stoichiometrically neutralize 100% of the acid groups on the alkyd polymer binder. The components of each example in Table 7 were weighed into a vial and agitated by shaking by hand at room temperature (approximately 73° F.) with the indicated amount of deionized (DI) water.

TABLE 7

| Example | Solvent | Solvent (g) | Duramac® WR216-3610 (g) | DI water (g) | TEA (g) |
|---|---|---|---|---|---|
| 28 | None | 0 | 5 | 5 | 0.765 |
| 29 | EtLPK | 0.75 | 4.25 | 5 | 0.65 |
| 30 | None | 0 | 2.5 | 7.5 | 0.3825 |
| 31 | EtLPK | 0.375 | 2.125 | 7.5 | 0.325 |

It was observed that Example 28 formed a pourable brown fluid. The viscosity of example 29 was qualitatively judged to be lower than in example 26 but was similar in appearance. Example 30 (higher water content) formed a transparent tan fluid that initially showed no signs of phase separation; however, a white precipitant formed at room temperature overnight. Example 31 was a low viscosity, opaque, light-orange fluid. No signs of separation were observed in examples 29 and 31 after sitting at room temperature for 60 days. Thus, the polymer binder dispersions were more stable when a ketal was present.

Examples 32-36

Examples 32-36 evaluated the use of EtLPK and EtLGK as a compatibilizing co-solvent and a coalescing agent for an alkyd polymer binder that was neutralized. The following examples were prepared according to the procedure in examples 28-31, except that triethylamine in an amount sufficient to theoretically neutralize 50% of the acid groups on the alkyd polymer binder was added.

TABLE 8

| Example | Solvent | Solvent (g) | Duramac® WR216-3610 (g) | DI water (g) | TEA (g) |
|---|---|---|---|---|---|
| 32 | None | 0 | 5 | 5 | 0.3825 |
| 33 | EtLPK | 0.25 | 4.75 | 5 | 0.363 |
| 34 | None | 0 | 2.5 | 7.5 | 0.1912 |
| 35 | EtLPK | 0.125 | 2.375 | 7.5 | 0.1817 |
| 36 | EtLGK | 0.125 | 2.375 | 7.5 | 0.1817 |

Example 32 formed an opaque, tan mixture with a viscosity too high to pour. Example 33 made an opaque tan liquid that was pourable. Example 34 was initially a tan liquid that was pourable but a white precipitant formed while sitting on the benchtop at room temperature overnight. The precipitant could be re-dispersed by shaking Examples 35 and 36 formed low viscosity tan fluids that were pourable. After sitting on the benchtop at room temperature for more than 60 days, example 36 showed signs of slight settling but the system was easily dispersed with gentle agitation. Example 35 showed no signs of precipitation after more than 60 days on the benchtop at room temperature. Thus, the dispersions were more stable when a ketal adduct as described above was present.

Examples 37-39

Examples 37-39 evaluated the use of EtLPK and EtLGK as a coalescing agent for an alkyd polymer binder that is heat cured.

The compositions in Table 9 were prepared scaled to fit in a 250-mL pot. The ingredients of the pigment grind were added in the order given and mixed with an overhead mixer with a mixed flow impeller for 5 minutes to attain a donut formation (toroidal flow). The ingredients of the letdown were added individually in the order given to the pigment grind and mixed for 5 minutes. Drawdowns of the compositions in examples 37-39 were made on polished steel panels (Q-Panel® from Q-Lab) with a drawdown bar of 2 mil (51 micrometer) thickness. The compositions were cured for 20 minutes at 175° C. The following properties are also shown in Table 9.

Pencil hardness was determined by scribing the cured coating with pencils of defined hardness (6B to 6H). The reported pencil hardness value was the softest pencil that marred the film.

Solvent resistance was determined by rubbing the cured coating with a 1-pound (0.37 kg) ball ping hammer head wrapped in cheesecloth soaked in methyl ethyl ketone (MEK). One back and forth cycle was 1 double rub. The stroke length was 3.25 inches (8.26 cm).

Crosshatch adhesion was determined by manually scoring a set of vertical and horizontal lines in a grid pattern with a spacing of 1-2 mm into a cured coating. Tape (3M Scotch Mailing and Storage Tape) was applied over the pattern and removed by hand. The extent of coating removal was estimated by visual inspection.

The physical characterizations showed that all three examples produced hard, smooth films with good solvent resistance.

TABLE 9

| Ingredient | Example 37 (weight in g) | Example 38 (weight in g) | Example 40 (weight in g) |
|---|---|---|---|
| Pigment Grind | | | |
| Duramac ® WR74-7451 | 144.6 | 144.6 | 144.6 |
| Triethylamine | 7.5 | 7.5 | 7.5 |
| Cymel ® 300 | 25.6 | 25.6 | 25.6 |
| Eastman EB ® | 19.5 | 0 | 0 |
| EtLPK | 0 | 19.5 | 0 |
| EtLGK | 0 | 0 | 19.5 |
| BYK ® 302 | 2.8 | 2.8 | 2.8 |
| Ti-Pure ® R-960 | 198.3 | 198.3 | 198.3 |
| DI water | 75 | 75 | 75 |
| Letdown | | | |
| Duramac ® WR74-7451 | 101.9 | 101.9 | 101.9 |
| Triethylamine | 9.2 | 9.2 | 9.2 |
| DI water | 360 | 360 | 360 |
| DI water | 6.8 | 6.8 | 6.8 |
| Physical Properties | | | |
| Pencil Hardness | 6H | 6H | 6H |
| MEK doublerubs | No mar after 100 doublerubs | No mar after 100 doublerubs | No mar after 100 doublerubs |
| Crosshatch adhesion | 5B - 0% removed | 5B - 0% removed | 5B - 0% removed |

Duramac ® WR74-7451 is a water reducible alkyd delivered in ethylene glycol monobutyl ether at 70% nonvolatiles by weight. It is based on tall oil fatty acids and has a reported acid number of 50.
Cymel ® 300 (Cytec Industries) is a high solids (98% non-volatile) methylated melamine polymer binder with approximately 76% monomer content.
BYK ® 302 (BYK) is solvent-free polyether modified polydimethylsiloxane surface additive.
Eastman EB ® (Eastman) is ethylene glycol monobutyl ether.
Ti-Pure ® R-960 (DuPont) is a rutile titanium dioxide pigment.

achieve a vortex for 2-3 minutes (approximately 1500-3000 rpm). The compositions in a series were prepared by serial dilution with water and mixed as stated above. Compositions with high viscosities did not form a vortex; in those cases, the mixing was at the highest speed possible for 2-3 minutes. The viscosity of each batch was measured on a Brookfield DVII+ Viscometer at 3 rpm. Results are shown in Table 10.

TABLE 10

| Ex. | Solvent | Solvent (g) | Duramac ® WR216-3610 (g) | DI water (g) | TEA (g) | Viscometer Spindle | Viscosity (cP) |
|---|---|---|---|---|---|---|---|
| 39 | None | 0 | 50 | 16.6 | 3.825 | RV4 | 22067 |
| 40 | EtLPK | 2.63 | 50 | 14.03 | 3.825 | RV4 | 7400 |
| 41 | None | 0 | 50 | 50 | 3.825 | RV7 | 560000 |
| 42 | EtLPK | 2.63 | 50 | 47.37 | 3.825 | RV7 | 193000 |
| 43 | None | 0 | 50 | 150 | 3.825 | RV4 | 25067 |
| 44 | EtLPK | 2.63 | 50 | 147.37 | 3.825 | RV4 | 12467 |

The results in Table 10 show that addition of the ketal EtLPK reduces the viscosity of the composition, allowing for easier processing at a given polymer binder solids.

Examples 45-49

Examples 45-49 show the use of EtLPK and EtLGK in wood stain formulations. The formulations were based on Duramac WR 216-3610 from Hexion Specialty Chemicals.

TABLE 11

| Ingredient | Ex. 45 Weight (g) | Ex. 46 Weight (g) | Ex. 47 Weight (g) | Ex. 48 Weight (g) | Ex. 49 Weight (g) |
|---|---|---|---|---|---|
| Ammonium hydroxide (50%) | 43.61 | 0 | 0 | 0 | 0 |
| Water | 87.5 | 0 | 0 | 0 | 0 |
| Duramac WR 216-3610 | 66.115 | 94.45 | 66.115 | 66.115 | 66.115 |
| EtLPK | 0 | 14.833 | 0 | 0 | 0 |
| EtLGK | 0 | 0 | 14.833 | 14.833 | 0 |
| Butyl cellosolve | 0 | 0 | 0 | 0 | 14.833 |
| 5% manganese Hydro-cure | 0.7 | 0.7 | 0.7 | 1.155 | 0.7 |
| 5% cobalt Hydro-cure II | 0.7 | 0.7 | 0.7 | 1.155 | 0.7 |
| Ammonium hydroxide (50%) | 0 | 24.5 | 19.11 | 19.11 | 14 |
| EtLPK | 14.833 | 0 | 0 | 0 | 0 |
| Ammonium hydroxide (50%) | 0 | 19.11 | 0 | 0 | 19.11 |
| Water | 0 | 87.5 | 87.5 | 87.5 | 87.5 |
| Ammonium hydroxide (50%) | 0 | 0 | 0 | As needed to adjust to pH 7-8 | 0 |

Examples 39-44

Polymer binder, EtLPK (if present), neutralizer, and water were added to a 250-mL steel beaker and mixed using an overhead mixer with impeller blades at a speed sufficient to Example 45

The composition of example 45 was prepared by pre-mixing ammonium hydroxide and water by hand in a 250 mL plastic beaker. The alkyd resin was added to a 250 mL stainless steel beaker and overhead mixing with a mixed flow impeller (INDCO, Inc.) was started at a speed of approximately 1500-3000 rpm. The pre-mix of ammonium hydroxide and water was slowly added to the resin with mixing over a time period of approximately 6-8 minutes. The viscosity noticeably increased during the early stages of addition but the viscosity declined as more of the ammonium hydroxide/water mixture was added. The batch was removed from the mixer and the driers were added and then mixed on the overhead mixer for another 2-3 minutes. The batch was poured into a half-pint, epoxy-lined steel paint can, sealed, and left to equilibrate without mixing for 20 hours. The batch was put back on the overhead mixer and EtLPK was then added to the batch with mixing for 2-3 minutes. The initial pH was 7.99.

The composition was drawn down onto polished steel panels (Q-Panel brand from Q-lab) with a drawdown bar with a thickness of 1 mil (26 micrometer). The film was left on the benchtop to cure (72 hours) at room temperature (about 73° C.) and formed a hard coating.

The composition was additionally drawn down onto sanded pine plywood panels with a drawdown bar with a thickness of 1 mil (26 micrometer) The film was left on the benchtop to cure at room temperature (about 73° C.). Dry time was monitored based on apparent tackiness or wetness sensation to the bare finger. The film felt dry to the touch within 4 hours.

Example 46

The composition of example 46 was prepared by adding the alkyd resin to a 250-mL stainless steel beaker and overhead mixing with a mixed flow impeller (INDCO, Inc.) was started at a speed of approximately 1500-3000 rpm. EtLPK was then added to the batch with mixing for 2-3 minutes. The batch was removed from the mixer and the driers were added and then mixed on the overhead mixer for another 2-3 minutes. A first portion of 50% ammonium hydroxide (24.5 g) was slowly added to the resin with mixing over a time period of approximately 2-3 minutes. A second portion of 50% ammonium hydroxide (19.11 g) was slowly added to the resin with mixing over a time period of approximately 2-3 minutes. Water was then added to the formulation with overhead mixing. The batch was easier to mix in example 44 than in example 43. The initial pH was 8.55.

The composition was drawn down onto sanded pine plywood panels with a drawdown bar with a thickness of 1 mil (26 micrometers). The film was left on the benchtop to cure at room temperature (about 73° C.). Dry time was monitored based on apparent tackiness or wetness sensation to the bare finger. The film felt dry to the touch within 4 hours.

The composition was also drawn down onto polished steel panels (Q-Panel brand from Q-lab) with a drawdown bar with a thickness of 1 mil (26 micrometers). The film was left on the benchtop to cure at room temperature (about 73° C.). "Dry to touch time," the elapsed time between drawdown and the time at which a lightly depressed finger no longer leaves a fingerprint or smudge on the coating, was found to be between 7 and 22 hours.

Example 47

The composition of example 47 was prepared by adding the alkyd resin to a 250-mL stainless steel beaker and overhead mixing with a mixed flow impeller (INDCO, Inc.) was started at a speed of approximately 1500-3000 rpm. EtLGK was then added to the batch with mixing for 2-3 minutes. The batch was removed from the mixer and the driers were added and then mixed on the overhead mixer for another 2-3 minutes. A first portion of 50% ammonium hydroxide (19.11 g) was slowly added to the resin with mixing over a time period of approximately 2-3 minutes. Water was then added to the formulation with overhead mixing. Additional 50% ammonium hydroxide was added to the composition just before drawdown to adjust the pH to the range of 7-8.

The composition was drawn down onto sanded pine plywood panels with a drawdown bar with a thickness of 10 mil (255 micrometer). The film was placed vertically on the benchtop to cure at room temperature (about 73° C.). There was little to no visual evidence of sag. When the film was checked for dryness 8 hours later, it was found to be dry to the touch with no apparent tackiness or wetness sensation to the bare finger.

Example 48

Example 48 was prepared by adding additional driers to the composition of example 47 and then adding 50% ammonium hydroxide to adjust the pH to the range of 7-8. The overall composition of example 46 is given in Table 11.

The composition of example 46 was drawn down onto sanded pine plywood panels with a drawdown bar with a thickness of 1 mil (26 micrometer). The film was left on the benchtop to cure at room temperature (about 73° C.). Dry time was monitored based on apparent tackiness or wetness sensation to the bare finger. The film felt dry to the touch within 4 hours.

Example 49

Example 49 is a comparative example using Butyl Cellosolve. The composition of example 49 was prepared by adding the alkyd resin to a 250-mL stainless steel beaker, and overhead mixing with a mixed flow impeller (INDCO, Inc.) was started at a speed of approximately 1500-3000 rpm. Butyl Cellosolve was then added to the batch with mixing for 2-3 minutes. The batch was removed from the mixer and the driers were added and then mixed on the overhead mixer for another 2-3 minutes. A first portion of 50% ammonium hydroxide (14 g) was slowly added to the resin with mixing over a time period of approximately 2-3 minutes. A second portion of 50% ammonium hydroxide (19.11 g) was slowly added to the resin with mixing over a time period of approximately 2-3 minutes. Water was then added to the formulation with overhead mixing. The initial pH was 7.2.

The composition was drawn down onto polished steel panels (Q-Panel brand from Q-lab) with a drawdown bar with a thickness of 1 mil (26 micrometer). The film was left on the benchtop to cure at room temperature (about 73° C.). "Dry to touch time," the elapsed time between drawdown and the time at which a lightly depressed finger no longer leaves a fingerprint or smudge on the coating, was found to be between 7 and 22 hours.

The terminology used herein is for the purpose of describing particular embodiments only and is not intended to be limiting. As used herein, the singular forms "a," "an," and "the" are intended to include the plural forms as well, unless the context clearly indicates otherwise. "Or" means "and/or." The terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The endpoints of all ranges directed to the same component or property are inclusive of the endpoint and independently combinable.

Unless otherwise defined, all terms (including technical and scientific terms) used herein have the same meaning as commonly understood by one of ordinary skill in the art to which this invention belongs. The term "paint" includes any protective exterior coatings that are also known as, for example, lacquer, electropaint, shellac, top coat, base coat, color coat, and the like. The term "stain" includes coating compositions that optionally include a pigment or a dye, and that at least partially impregnate the substrate, such as wood, after coating. The term "clear-coat" includes coating compositions as described above without pigments or dyes. "Clear-coat" compositions can also at least partially impregnate the substrate on which it is coated.

The compounds made by the above-described methods have, in embodiments, one or more isomers. Where an isomer can exist, it should be understood that the invention embodies methods that form any isomer thereof, including any stereoisomer, any conformational isomer, and any cis-, trans-isomer; isolated isomers thereof; and mixtures thereof.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. Alkyl groups may be straight-chained or branched. Throughout the specification, reference is made to various bivalent groups. Such groups are the same as the monovalent groups that are similarly named, and are typically indicated with an "ene" suffix. For example, a C1 to C6 alkylene group is a bivalent linking group having the same structure as a C1 to C6 alkyl group.

All cited patents, patent applications, and other references are incorporated herein by reference in their entirety.

The various embodiments described above are provided by way of illustration only and should not be construed to limit the claims attached hereto. The present invention can suitably comprise, consist of, or consist essentially of, any of the disclosed or recited elements. Thus, the invention illustratively disclosed herein can be suitably practiced in the absence of any element, which is not specifically disclosed herein. Various modifications and changes will be recognized that can be made without following the example embodiments and applications illustrated and described herein, and without departing from the true spirit and scope of the following claims.

What is claimed is:

1. A water-reducible coating composition, comprising:
a water-reducible polymer binder;
water; and
a ketal adduct of formula (1)

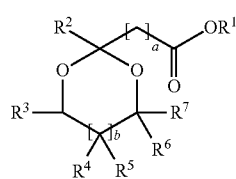

(1)

wherein
$R^1$ is C1-6 alkyl, C2-6 alkenyl, C3-6 cycloalkyl, C5-6 cycloalkenyl, C6-12 aryl, C7-C13 arylalkylene, or —$(CH_2)_s OR^8$ wherein s is 1-3 and $R^8$ is C1-6 alkyl or $(OCH_2CH_2)_t OCH_2CH_3$ wherein t is 1-10,
$R^2$ is hydrogen or C1-14 alkyl,
$R^3$ is hydrogen or C1-6 alkyl,
each $R^4$ and $R^5$ is independently
hydrogen, C1-6 alkyl, C1-6 alkyl substituted with up to four $OR^9$ groups wherein $R^9$ is hydrogen, C1-6 alkyl, or $C(O)R^{10}$ wherein $R^{10}$ is C1-6 alkyl, or
$R^4$ and $R^5$ taken together are a double-bonded oxygen, or
when b is 1, $R^3$ and $R^4$ together with their directly attached carbons form a fused cycloaliphatic ring having a total of 5-6 carbon atoms or 4-5 carbon atoms and 1-2 oxygen atoms,
$R^6$ is
hydrogen, C1-6 alkyl, or hydroxymethylene, or
when b is 0, $R^3$ and $R^6$ together with their directly attached carbons form a fused cycloaliphatic or aromatic ring having a total of 5-6 carbon atoms or 4-5 carbon atoms and 1-2 oxygen atoms,
$R^7$ is
hydrogen, C1-6 alkyl, C1-6 alkyl substituted with up to four $OR^8$ groups wherein $R^8$ is hydrogen, C1-6 alkyl, or $C(O)R^{10}$ wherein $R^{10}$ is C1-6 alkyl, or
C5-6 cylcoalkyl that is optionally substituted with an oxygen in the ring and further optionally substituted with 1-2 hydroxyl or $OR^{11}$ wherein $R^{11}$ is C1-3 alkyl,
a is 0-6, and
b is 0-1,
wherein the composition comprises about 0.1 to about 30 wt. % of the ketal adduct, based on the weight of the water-reducible polymer binder.

2. The water-reducible coating composition of claim 1, wherein
$R^1$ is C1-6 alkyl or C7-C13 arylalkylene,
$R^2$ is C1-6 alkyl,
$R^3$ is hydrogen or C1-3 alkyl,
$R^4$ and $R^5$ is each independently hydrogen, C1-3 alkyl, or C1-4 alkyl substituted with 1-4 —$OR^9$ groups wherein $R^9$ is a hydrogen or C1-3 alkyl,
$R^6$ is hydrogen, C1-3 alkyl, or hydroxymethylene,
$R^7$ is hydrogen, C1-4 alkyl, or C1-4 alkyl substituted with 1-4 —$OR^9$ groups wherein $R^9$ is a hydrogen or C1-3 alkyl,
a is 1-3, and
b is 0-1.

3. The water-reducible coating composition of claim 1, wherein
$R^1$ is C1-6 alkyl,
$R^2$ is methyl,
$R^3$, $R^4$, and $R^5$ are each independently hydrogen, C1-4 alkyl, or C1-4 alkyl substituted with 1-2 —$OR^9$ groups wherein $R^9$ is hydrogen or a C1-3 alkyl group,
$R^6$ is hydrogen,
$R^7$ is hydrogen, C1-4 alkyl, or C1-4 alkyl substituted with 1-4 —$OR^9$ groups wherein $R^9$ is hydrogen or methyl,
a is 1-3, and
b is 0-1.

4. The water-reducible coating composition of claim 1, wherein
$R^1$ is C1-6 alkyl,
$R^2$ is methyl,
$R^3$, $R^4$, and $R^6$ are each independently a hydrogen or a C1-3 alkyl,
$R^5$ is a hydrogen, C1-4 alkyl, or C1-4 alkyl substituted with 1-2 $OR^9$ groups wherein $R^9$ is a hydrogen or C1-3 alkyl, $R^7$ is a hydrogen, C1-4 alkyl, or C1-4 alkyl substituted with 1-4 —$OR^9$ groups wherein $R^9$ is hydrogen or C1-3 alkyl, a is 1-3, and b is 0-1.

5. The water-reducible coating composition of claim 1, wherein $R^1$ is C1-4 alkyl, $R^2$ is methyl, $R^3$ is hydrogen, $R^4$ is hydrogen, $R^5$ is hydrogen, C1-3 alkyl, or C1-3 alkyl substituted with 1-2 —$OR^9$ groups wherein $R^9$ is hydrogen or methyl, $R^6$ is hydrogen, $R^7$ is hydrogen, C1-3 alkyl, or C1-3 alkyl substituted with 1-2 —$OR^{10}$ groups wherein each $R^{10}$ is independently a hydrogen or methyl, wherein one of $R^5$ and $R^7$ is hydrogen, a is 1-2, and b is 0-1.

6. The water-reducible coating composition of claim 1, wherein $R^1$ is C1-4 alkyl, $R^2$ is methyl, $R^3$ is hydrogen, $R^6$ is hydrogen, or C1-3 alkyl, $R^7$ is hydrogen, C1-3 alkyl, or C1-4 alkyl substituted with 1-2 $OR^{10}$ groups wherein $R^{10}$ is a hydrogen or C1-3 alkyl, a is 1-2, and b is 0.

7. The water-reducible coating composition of claim 1, wherein $R^1$ is C1-4 alkyl, $R^2$ is methyl, $R^3$ is hydrogen, $R^6$ is hydrogen, methyl, or ethyl, $R^7$ is methyl, ethyl, —$CH_2OH$, —$CH_2OCH_3$, or —$CH_2OCH_2CH_3$, —$CH(OH)CH_2OH$, or —$(CH(OH))_3 CH_2OH$, a is 2, and b is 0.

8. The water-reducible coating composition of claim 1, wherein $R^1$ is C1-4 alkyl, $R^2$ is methyl, $R^3$ is hydrogen, $R^4$ is hydrogen, methyl, ethyl, —$CH_2OH$, or $CH_2OCH_3$, —$CH_2OCH_2CH_3$, $R^5$ is hydrogen, methyl, ethyl, —$CH_2OH$, —$CH_2OCH_3$, —$CH_2OCH_2CH_3$, —$CH(OH)CH_2OH$, or —$(CH(OH))_3 CH_2OH$, $R^6$ is hydrogen or C1-3 alkyl, $R^7$ is hydrogen or C1-3 alkyl, a is 2, and b is 1.

9. The water-reducible coating composition of claim 1, wherein the ketal adduct is of formula (1a)

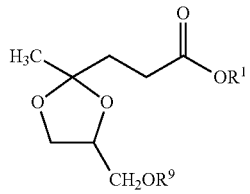

(1a)

wherein $R^1$ is a C1-4 alkyl and $R^9$ is hydrogen or C1-4 alkyl.

10. The water-reducible coating composition of claim 1, wherein the ketal adduct is of formula (1b)

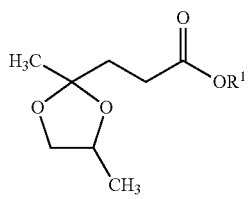

(1b)

wherein $R^1$ is a C1-4 alkyl.

11. The water-reducible coating composition of claim 1, comprising about 1 to about 10 wt. % of the ketal adduct, based on the weight of the water-reducible polymer binder.

12. The water-reducible coating composition of claim 1, wherein the water-reducible polymer binder composition comprises an acrylic, polyester, polyurethane, alkyd, silicone-modified alkyd, epoxy, epoxy ester, alkyds, or a combination thereof.

13. The water-reducible coating composition of claim 1, wherein the water-reducible polymer binder comprises a polyurethane or alkyd.

14. The water-reducible coating composition of claim 1, further comprising a pigment.

15. A method of preparing the water-reducible coating composition of claim 1, comprising:

combining the water-reducible polymer binder, the ketal adduct of formula 1, and an aqueous phase.

16. The method of claim 15, wherein the combining is by synthesizing the water-reducible polymer binder in the presence of the ketal adduct, prior to combining with the aqueous phase.

17. The method of claim 15, comprising combining the ketal adduct and the water-reducible polymer binder after synthesis of the water-reducible polymer binder.

18. The method of claim 17, wherein the combining comprises combining the ketal adduct and the water-reducible polymer binder prior to combining with an aqueous phase.

19. The method of claim 17, wherein the combining comprises combining the water-reducible polymer binder and the aqueous phase, prior to combining with the ketal adduct.

20. A method of coating a substrate, comprising:

contacting the water-reducible coating composition of claim 1 with a surface of the substrate to form a coating; and drying the coating.

21. The method of claim 20, further comprising allowing the coating composition to at least partially impregnate the substrate.

22. A coated substrate, comprising:
a substrate having a surface; and
a coating disposed on the surface, wherein the coating comprises
a water-reducible polymer binder;
a pigment; and
a ketal adduct of claim 1.

23. The coated substrate of claim 22, wherein the coating at least partially impregnates the substrate, and conforms to an interior surface of the substrate.

24. The coated substrate of claim 22, wherein the coating is a dried film.

25. A water-reducible coating composition, comprising:
a water-reducible polymer binder;
water; and
a ketal adduct of formula (1)

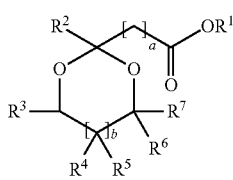

(1)

wherein
$R^1$ is C1-4 alkyl,
$R^2$ is methyl,
$R^3$ is hydrogen,
$R^4$ is hydrogen, methyl, ethyl, —$CH_2OH$, or $CH_2OCH_3$, —$CH_2OCH_2CH_3$,
$R^5$ is hydrogen, methyl, ethyl, —$CH_2OH$, —$CH_2OCH_3$, —$CH_2OCH_2CH_3$, —$CH(OH)CH_2OH$, or —$(CH(OH))_3 CH_2OH$,
$R^6$ is hydrogen or C1-3 alkyl,
$R^7$ is hydrogen or C1-3 alkyl,
a is 2, and
b is 1.

26. The water-reducible coating composition of claim 25, wherein the composition comprises about 1 to about 10 wt. % of the ketal adduct, based on the weight of the water-reducible polymer binder.

27. The water-reducible coating composition of claim 25, wherein the water-reducible polymer binder composition comprises an acrylic, polyester, polyurethane, alkyd, silicone-modified alkyd, epoxy, epoxy ester, alkyds, or a combination thereof.

28. The water-reducible coating composition of claim 25, wherein the water-reducible polymer binder comprises a polyurethane or alkyd.

29. The water-reducible coating composition of claim 25, further comprising a pigment.

30. A method of preparing the water-reducible coating composition of claim 25, comprising:
combining the water-reducible polymer binder, the ketal adduct of formula 26, and an aqueous phase.

31. A method of coating a substrate, comprising:
contacting the water-reducible coating composition of claim 25 with a surface of the substrate to form a coating; and
drying the coating.

32. A coated substrate, comprising:
a substrate having a surface; and
a coating disposed on the surface, wherein the coating comprises
a water-reducible polymer binder;
a pigment; and
a ketal adduct of claim 25.

33. The coated substrate of claim 32, wherein the coating at least partially impregnates the substrate, and conforms to an interior surface of the substrate.

34. The coated substrate of claim 32, wherein the coating is a dried film.

35. A water-reducible coating composition, comprising:
a water-reducible polymer binder;
water; and
a ketal adduct of formula (1b)

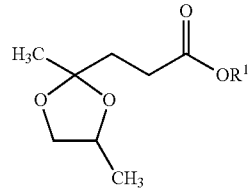

(1b)

wherein $R^1$ is a C1-4 alkyl.

36. The water-reducible coating composition of claim 35, wherein the composition comprises about 1 to about 10 wt. % of the ketal adduct, based on the weight of the water-reducible polymer binder.

37. The water-reducible coating composition of claim 35, wherein the water-reducible polymer binder composition comprises an acrylic, polyester, polyurethane, alkyd, silicone-modified alkyd, epoxy, epoxy ester, alkyds, or a combination thereof.

38. The water-reducible coating composition of claim 35, wherein the water-reducible polymer binder comprises a polyurethane or alkyd.

39. The water-reducible coating composition of claim 35, further comprising a pigment.

40. A method of preparing the water-reducible coating composition of claim 35, comprising:
combining the water-reducible polymer binder, the ketal adduct of formula 36, and an aqueous phase.

41. A method of coating a substrate, comprising:
contacting the water-reducible coating composition of claim 35 with a surface of the substrate to form a coating; and
drying the coating.

42. A coated substrate, comprising:
a substrate having a surface; and
a coating disposed on the surface, wherein the coating comprises
a water-reducible polymer binder;
a pigment; and
a ketal adduct of claim 35.

43. The coated substrate of claim 35, wherein the coating at least partially impregnates the substrate, and conforms to an interior surface of the substrate.

44. The coated substrate of claim 35, wherein the coating is a dried film.

* * * * *